United States Patent [19]
Smarook

[11] 3,919,446
[45] Nov. 11, 1975

[54] PROCESS FOR EXPANDING THERMOFORMABLE MATERIALS AND PRODUCTS

[75] Inventor: Walter H. Smarook, Somerville, N.J.

[73] Assignee: Union Carbide Corporation, New York, N.Y.

[22] Filed: Dec. 26, 1973

[21] Appl. No.: 428,624

Related U.S. Application Data

[63] Continuation-in-part of Ser. No. 213,702, Dec. 29, 1971, abandoned.

[52] U.S. Cl. ............... 428/116; 264/41; 264/164; 264/261; 264/275; 264/346; 425/110; 425/812; 428/119; 428/134; 428/137; 428/310
[51] Int. Cl.² ................. B29C 17/02; B32B 3/12
[58] Field of Search ... 264/41, 291, 164, 47, 210 R, 264/261, 275, 346; 425/812, 110; 161/68, 69, 161; 65/DIG. 5, 59

[56] References Cited
UNITED STATES PATENTS
3,837,990  9/1974  McConnell et al. .................. 161/68

OTHER PUBLICATIONS
Billmeyer, Fred W. "Textbook of Polymer Science" New York, Interscience, c1962, pp. 198-204.
Encyclopedia of Polymer Science and Technology, Vol. 12, Section: Sizing, New York, Interscience, c1970 pp. 585-588.

*Primary Examiner*—Philip Anderson
*Attorney, Agent, or Firm*—J. J. O'Connell

[57] ABSTRACT

A low pressure process for expanding the cross-section of a blank of thermoformable material with the attendant formation of one or more voids having a partial vacuum or reduced pressure within the cross-section of such blank, which comprises venting the voids during the expansion of the cross-section so as to equilibrate the level of pressure within the voids with the level of pressure without the blank of thermoformable material so as to thereby regulate the uniformity and integrity of the resulting cross-sectional geometry of the expanded blank.

Products having an expanded cross-section are formed by such process.

80 Claims, 52 Drawing Figures

FIG. 14
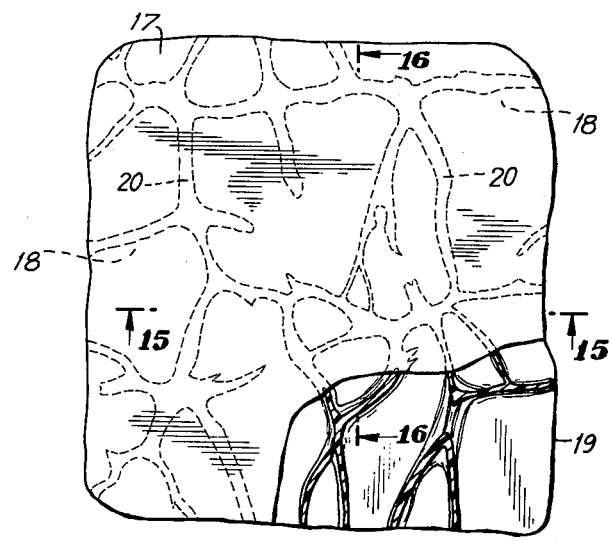
FIG. 15
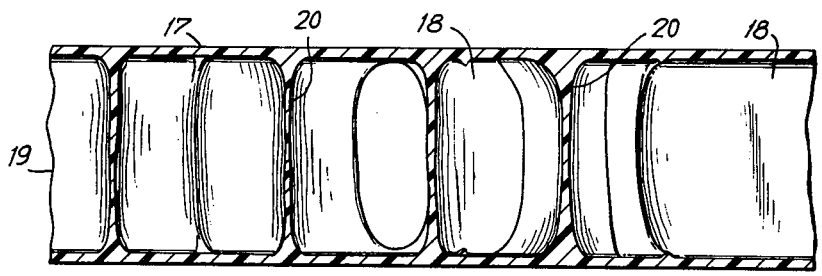
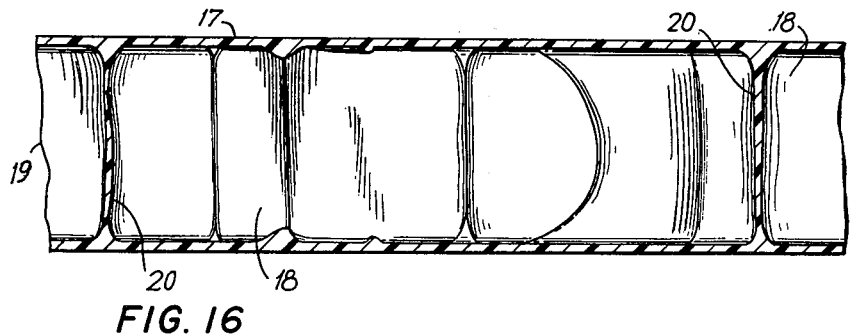
FIG. 16

PROCESS FOR EXPANDING THERMOFORMABLE MATERIALS AND PRODUCTS

CROSS-REFERENCE TO RELATED PATENT APPLICATIONS

This patent application is a continuation-in-part of patent application Ser. No. 213,702 filed Dec. 29, 1971, now abandoned.

BACKGROUND OF THE INVENTION

1. Field of the Invention

This invention relates to the art of forming or shaping end-use objects from thermoformable materials.

2. Description of the Prior Art

Structural panels are used for many applications. For certain applications it is desired that the panel have both rigidity and structural strength and that it also be relatively light-weight. In order to provide such panels various techniques have been devised for providing a core of rigid material having a relatively low density between skins of material which have relatively high densities. Most of these techniques require the use of specific adhesives for the purpose of bonding the low density cores to the high density skin laminae. This adhesive bonding technique has many drawbacks. One such drawback lies in the fact that it is not always possible to find an adhesive which is capable of readily bonding the two materials which one would desire to place in a laminate of this type. In order to provide such adhesives for such different laminae, it is necessary in some cases to devise relatively expensive adhesives. Considerable time and effort moreover, is involved in utilizing some adhesives in the fabrication of the laminates. Many of these adhesives, for example, contain solvents. During the manufacture of the laminate with such adhesives it is necessary to provide a certain amount of time in which the solvent is allowed to evaporate from the adhesive before actual bonding occurs. This adhesive drying time tends to curtail the use of such solvent containing adhesives in applications which require the use of assembly line techniques in the fabrication of the laminates. It furthermore poses problems of solvent entrapment within the composite structure, which may lead to lower physical properties and odor problems.

Another drawback attendent upon the use of various types of adhesive relates to the use of adhesives which are of the curable type. These adhesives have a so-called "potlife" within which the adhesive must be used or it loses its utility. This potlife characteristic of the adhesive also tends to mitigate against the use of such adhesives for certain types of applications. The use of such adhesives also results in economic loss arising from the loss of adhesive which cannot be properly used during the potlife of such adhesives.

U.S. Pat. Nos. 2,502,304, 2,962,409 and 3,367,760 disclose processes for making laminates without the use of adhesives, but the laminates thus prepared have relatively little utility because of the relatively simple core geometries that can be produced using the process as disclosed in such patents.

SUMMARY OF THE INVENTION

Shaped articles made from thermoformable material, and expanded to provide a relatively lightweight core density and having a variety of configurations, and good physical properties are prepared in a relatively facile manner by expanding the cross-section of the thermoformable material in such a way that one or more voids of reduced pressure are formed within the cross-section, and simultaneously venting the voids during the expansion of the cross-section of the material so as to equilibrate the pressure within the voids with the pressure without the thermoformable material so as to thereby regulate the uniformity and integrity of the resulting cross-sectional geometry in the expanded material.

An object of the present invention is to provide articles of commerce made from thermoformable materials and having an expanded cross-section.

A further object of the present invention is to provide rigid structural elements having a variety of lightweight core constructions or geometries.

A further object of the present invention is to provide a process wherein lightweight expanded articles may be readily formed from thermoformable materials, using assembly line techniques, and without the use of adhesives.

Another object of the present invention is to form, without the use of adhesives, expanded structures having regularly shaped voids therein of various geometric configurations and having enhanced rigidity properties provided by relatively large areas of discontinuous and/or continuous skin surface area as an integral feature of the expanded structures.

Another object of the present invention is to form expanded structures having perforations in the faces of the structures, which perforations have relatively thin lip members around the periphery thereof, and which lip members provide the perforations with an undercut structural feature.

Another object of the present invention is to provide, without the use of foaming or blowing agents, flexible or rigid expanded structures having relatively large amounts of void spaces therein.

DEFINITIONS

With respect to the herein provided description, examples and claims relating to the present invention the following definitions apply:

"Thermoformable" means that the thereby described material is a solid at 25°C. which can be reshaped or reformed above some higher temperature.

"Thermoplastic" o means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50% of its polymeric structure when subjected to X-ray analysis.

"Ta" means the temperature at which a thermoplastic material exhibits hot tack adhesion. "Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.
"Normally solid" means solid at 25°C.
"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C.

| Polymer | | Tg | Tm | Ta |
|---|---|---|---|---|
| 1. | polyethylene Density=0.96 M.I.=3-5 | — | 126 | 135-140 |
| 2. | polyethylene Density=0.94 M.I.=12-15 | — | 122 | 130-135 |
| 3. | polyethylene Density=0.924 M.I.=1.2 | — | 100-108 | 120 |
| 4. | polyvinyl chloride | >5 | — | 155 |
| 5. | Nylon-6 | 60 | 215-220 | 240 |
| 6. | Nylon-6,6 | 65 | 260 | 270 |
| 7. | Polycaprolactone | — | 58 | 60 |
| 8. | Polyurethane (polyester) | — | 130-170 | 160-180 |
| 9. | Polysulfone | 185 | — | 300 |
| 10. | polypropylene | −5 to 0 | 165-170 | 170 |
| 11. | polycarbonate | 150 | — | 225 |
| 12. | polymethylmethacrylate | 90 | — | 160 |
| 13. | polystyrene | 100 | — | 185 |
| 14. | polystyrene (impact grade) | 100 | — | 180 |
| 15. | polyacetal | −60 | 165 | 170 |
| 16. | 90/10 mol % copolymer of polymethacrylonitrile & styrene | 115 | — | 240 |
| 17. | 70/30 mol % copolymer of polyvinyl alcohol and polyvinyl acetate | 50-60 | — | 120-130 |
| 18. | 94.2/5.7 mol % copolymer of ethylene and ethyl acrylate | −20 | — | 110 |
| 19. | 91.8/8.2 mol % copolymer of ethylene and acrylic acid | 18 | — | 110 |
| 20. | 82/18 mol % copolymer of ethylene and vinyl acetate M.I.=2.3 | −15 | — | 120 |
| 21. | styrene-butadiene copolymer | 90 | — | 190 |
| 22. | styrene-acrylonitrile copolymer | 100 | — | 190 |
| 23. | hydroxy propyl cellulose | 100 | — | 190 |
| 24. | (solution blend of) polystyrene and polyphenylene oxide | 115-120 | — | 235 |

It has now been found that the cross-section of a thermoformable material may be readily expanded so as to provide a large variety of end use objects having a wide selection of expanded cross-sectional geometries by expanding the cross-section of a blank of such thermoformable materials so as to cause the concurrent formation of one or more voids of reduced pressure within the expanding cross-section of such blank, and venting the voids during the expansion of such cross-section so as to equilibrate the pressure within the voids with the pressure outside the blank and thereby regulate the uniformity and integrity of the resulting cross-sectional geometry of the expanded blank. The expansion of the blank is conducted while the blank is heated so as to place the thermoformable material in a thermoformable state, i.e., the blank is heated to a temperature which is ≥ the fusion point of the thermoformable material. The thermoformable material is expanded between a pair of separable mold plates, which mold plates are moved apart to effect the desired expansion of the blank of thermoformable material, while the blank is attached to the surface of such mold plates, in one way or another as disclosed below, during the expansion operation.

BRIEF DESCRIPTION OF THE DRAWINGS

FIGS. 14 to 16 show the top and cross-sectional views of another type of expanded structure that may be made from a blank in sheet form.

Figure 1:
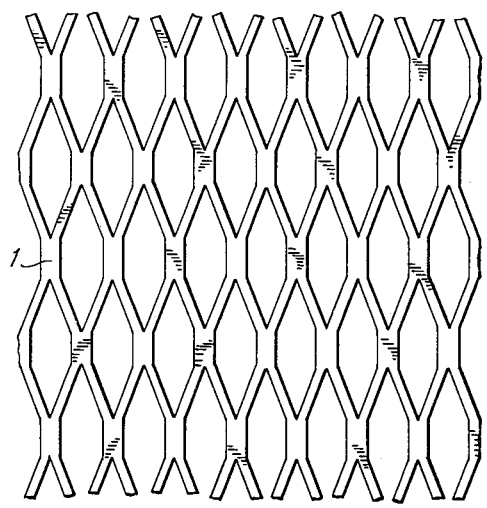
FIG. 1 shows a top view of a sheet of open mesh metal which may be used as a removable mold plate.

The preferred embodiment of the process of the present invention is based upon the property of various materials, and particularly thermoplastic polymeric materials, to exhibit hot-tack adhesion to practically all substrates at a temperature, $T_a$, which is usually above the $T_g$ or $T_m$ of the thermoplastic polymeric material. Thus, in a fused or molten state, the thermoplastic polymeric material will wet out practically all substrate surfaces and thereby impart adhesion thereto. In some cases this adhesion phenomena will be lost when the thermoplastic polymeric material cools below its $T_m$ or $T_g$.

Thus, if a blank of thermoplastic polymeric material is placed between two mold plates of a heated press so that the temperature of the mold plates is about $T_a$ or 5° to 10°C. above the $T_a$ of the polymeric material in the blank, and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surfaces and the fused material.

Although the mass of the expanded fusible material does not change, the cross-sectional configuration of the fusible material is expanded in the direction of the two separated plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occurring. The strength of the bond will thus depend on the nature of the thermoplastic resin in the blank, the nature of the mold plate materials, the extent of the surface area of the mold plate which is in contact with the fused blank and the cohesive strength and flow properties of the polymeric plastic.

Thus, the use as mold surfaces, of materials which are more readily wet by the fused plastic blank, will allow for a wider separation of the mold surfaces with the fused plastic bonded thereto, than would the use of mold surfaces made from materials which are not as readily wet by the fused blank. Also, the use of the blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure are formed within the body of the expanding plastic. Thus, although the mass of plastic does not change, the volume of the expanding cross-section of the plastic does increase. The frequency of the occurrence of these voids, as well as their size and shape, i.e., the pattern of voids, is largely determined by the pattern of the points or areas of contact which exist between the mold surfaces and the expanding plastic during the expansion process. In order to maintain the desired pattern of the voids, it is necessary to vent the voids during the expansion step so as to equilibrate the pressure within the voids with the pressure without the expanding material.

The pattern of the points or areas of contact between the mold surfaces and the thermoplastic blank can be readily varied. For example, the contact surfaces of the mold plates and/or the blank can be provided with various designs of recessed or raised surfaces so that when the contact surfaces of the mold plates and the blank are brought face to face, only the raised surfaces of the mold plates and the blank will actually contact each other. Another procedure for providing a pattern of points of areas of contact would be to use mold plates and blanks whose contact surfaces are in the form of a mesh, lattice or net work type of configuration. Thus, only the strands of the mesh, lattice, or network are available for contact purposes. The open areas in the mesh, lattice or net-work configurations would not provide surface contact between the mold plates and the blanks. These various types of surface designs in the mold plates and/or the blanks could thus provide at least some areas of contact between the surfaces of the mold plates and the surfaces of the blank. For example, where the blank is in the form of a sheet of material having smooth and flat contact surfaces, some areas of contact between the surfaces of the blank and the mold plates could be provided by using mold plates which have raised contact surfaces so designed as to provide only such raised surface area for contacting the surfaces of the blanks, or by using mold plates which have mesh shaped contact faces. Conversely, where the mold plates have flat smooth surfaces, the blank could be provided with the same selective type of raised or meshed surface area which would provide the desired pattern of contact surface area.

The desired pattern of contact areas can also be supplied to the contact surfaces of the mold plates and/or the blanks in another fashion. A negative of the desired pattern can be affixed to the contact surfaces of the blanks or the mold plates bu the use of masking means, such as strips or panels of masking tape, kraft paper, "Mylar film" or other materials which will prevent the fused thermoplastic material from adhering to the surfaces of the mold plates. Thus, the fused plastic will only be allowed to adhere to the surfaces of the mold plates at those areas of contact between the surfaces of the mold plates and the blanks where there is no masking means present.

In other embodiments of the process of the present invention the entire surface areas of the contact surfaces of the blanks and of both of the mold plates can be used for providing the desired extent of the areas of contact between the contact surfaces of the mold plates and the blanks.

Thus it may be said that the cross-sectional geometry of the expanded blank is a function of the design of the areas of contact which is provided in the contact surfaces of the mold plates and/or the blanks. It is such design which determines the extent to which the surface areas of the mold plates and the blank are kept in contact during the expansion step in the process, and the extent of such contact areas is what determines the pattern of the voids in the expanding blank, and thus in the cross-sectional geometry of the expanded blank.

The voids created in the blank during the expansion step can be vented through one or both of the mold plates, or by the use of venting means inserted in the blank which is being expanded, or, in the case of the use of a negative perforation means, the voids or cells are vented from the outside of the blank and between the negative and the mold plate. Venting of the negative perforation means may also be accomplished by providing a vent hole over the negative perforation means which vent hole would be vented through the mold plate to the atmosphere.

The speed with which the mold plates are moved apart during the expansion of the blank is not critical. The speed to be used is governed by the cohesive flow properties of the thermoformable material used in the fused blank. Where the blank is used in the form of sheets having thicknesses of the order of about 40 to 300 mils, such blanks may be expanded $\geq 2$ to 20 times such thicknesses according to the present invention by expanding the fused blank at a rate of separation of the mold plates of about 10 to 150 mils per second.

After a desired separating distance has been achieved, the expanded blank is cooled, to a temperature below the heat distortion point of the plastic, the press is opened and the expanded blank is removed therefrom. At this point the expanded blank may or may not continue to adhere to the surfaces of the mold plates, depending on the nature of the mold surfaces and the polymeric materials, as will be discussed below.

The expanded blank is cooled to a temperature below its heat distortion point, before being removed from the press so as to freeze, so to speak, the configuration of the expanded blank, and thus prevent distortion of such configuration.

Thus in the preferred embodiment of the process of the present invention the cross-section of the blank of thermoformable material having a Ta is expanded between a pair of mold plates so as to provide a product having an expanded cross-sectional geometry in the following sequence of steps:

the thermoformable material is inserted between the surfaces of a pair of mold plates while such material is heated to a temperature which is $\geq$ the Ta of such material, the thus heated thermoformable material is then adhesively bonded by hot tack adhesion to the surfaces of each of the mold plates, the mold plates are then pulled apart, while the heated thermoformable material is thus adhesively bonded to the surfaces thereof, so as to expand the cross-section of the thermoformable material, and thereby effect within the expanding thermoformable material one or more voids of reduced pressure, the voids are vented during the pulling apart of the mold plates so as to equilibrate the pressure within the voids with the pressure without the blank and thereby preserve the pattern and the integrity of the voids in the resulting expanded cross-sectional geometry, and then the expanded thermoformable material is cooled to a temperature which is below the heat distortion point of such material.

The mold plates which are not to be removed from the cooled expanded thermoformable material, must be disengageable from the device used to move them apart during the expansion step in the process described above. One or both of the mold plates can also be more permanently affixed to such device, in which case the cooled, expanded thermoformable material is then removed from the device and the mold plate(s) affixed thereto.

When the expanded blank is cooled below its Ta, or even below its Tm and/or Tg, it will not necessarily, in all cases, automatically lose its adhesion to the surfaces of the mold plates. The expanded blanks which are made of materials which are non-polar in nature, such as the polyolefin resins, will generally readily lose their adhesion to the surfaces of all of the types of mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled expanded blank, can, where desired, be mechanically stripped from the mold plates without disrupting the integrity or configurations of the expanded blank. The tendency of both the polar and non-polar types of materials, to continue to adhere to the mold plates after the expanded blank made therewith is cooled below its heat distortion point can be enhanced by using mold plates which have roughened contact surfaces. The rougher is such contact surface, the better will be the adhesive bond with the cooled plastic.

In addition to the use of hot tack adhesion, other means may be used for affixing the thermoformable material to the mold plates during the expansion of the cross-section of the thermoformable material. In one such other procedure the thermoformable material may be loaded with a filler which is susceptible to being magnetized such as, powdered iron and barium ferrite, and the thus filled thermoformable material may be affixed to the mold plates during the expansion step, in any desired pattern of points or areas of contact therebetween by applying a magnetic field to selected portions of the contact surfaces of the mold plates. The thermoformable material may also be affixed to the surfaces of the mold plates during the expansion step by the application of electrostatic forces between the expanding thermoformable material and selected contact areas of the surfaces of the mold plates. Regardless of the means used to affix the thermoformable material to the mold plates during the expansion step, the thermoformable material must be heated to a fused or molten state during the expansion step.

A better understanding of the process of the present invention can be obtained from the process sequences illustrated in FIGS. 1 to 5 of the drawings.

FIG. 1 shows a top view of a type of mold plate 1 which may be used in the process of the present invention. Mold plate 1 is an expanded steel mesh with a diamond shaped metal pattern. The pattern of the steel mesh need not be diamond shaped, of course, it may have other open mesh configurations. It is the surfaces of metal mesh which provide the mold contact surfaces which will contact the blank of plastic.

Figure 2:
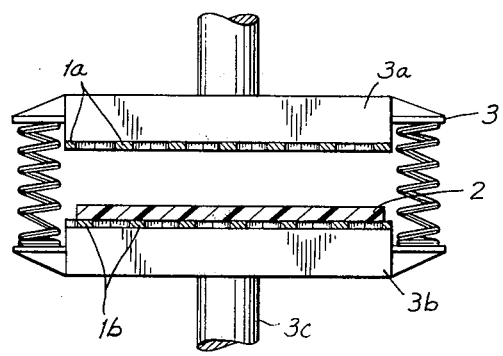
FIGS. 2-4 show a sequence of steps involved in increasing the cross-sectional area of a blank of thermoformable material according to one embodiment of the present invention using two sheets of metal mesh as shown in FIG. 1 as removable mold plates.
Figure 3:
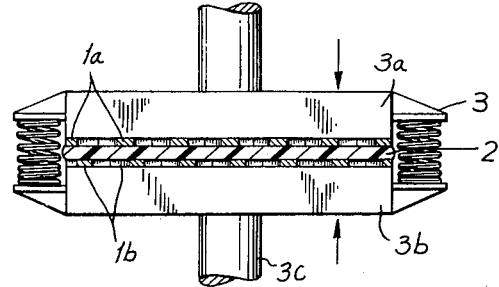
Figure 4:
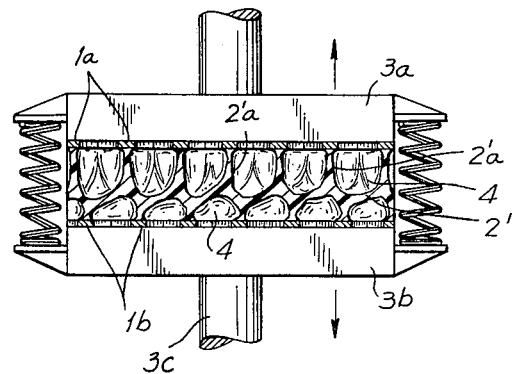

FIGS. 2 to 4 show a sequence of steps involved in using mold plate 1 according to one modification of the process of the present invention. In FIG. 2 there is shown a blank 2 of thermoformable material having a Ta, in the form of a smooth surfaced sheet of such material, which is inserted between the open platens, 3a and 3b, of a Carver press. To the faces of each of platen 3a and 3b of the press there is attached a metal mesh mold plate. In the embodiment shown, the contact points or areas of the top mold plate 1a are not vertically aligned with the contact points or areas of the lower mold plate 1b. In other embodiments such upper and lower contact points or areas can be vertically aligned. The mold plates 1 are heated, for the purposes of the present invention, to a temperature which is about Ta or 5° to 10°C. above the Ta of the blank 2. The mold plates may be heated before, preferably, or after the blank is inserted in the press, and they are preferably heated conductively through platens 3a and 3b.

The Carver press described herein is a 20 ton hand operated hydraulic ram 3c which actuates a movable 6 inch × 6 inch platen 3a again a fixed platen 3b. The platens are usually heated electrically. Although the Carver press is the preferred means for bringing the heated mold plates into contact with the blanks, according to the present invention, other suitable devices may be used, such as heated belts.

The process of the present invention may be conducted continuously or discontinuously. Using devices such as the Carver press, the process is readily conducted discontinuously. The process may be conducted continuously by feeding a continuous blank of thermoformable material between a pair of heated continuous belts of materials suitable as mold surfaces.

FIG. 3, shows the press after it has been closed with sufficient pressure to cause the top and bottom mold plates to exert a slight pressure on blank 2 so as to cause the heated blank to wet the surfaces of mold plates 1a and 1b which come in contact with the blank. The amount of pressure required for this step is of the order of about 1 ounce to 4 pounds per square inch. The pressure causes the blank to be slightly compressed.

FIG. 4 shows the platens pulled apart after the expansion step, with the expanded blank 2' adhering to points or areas of contact with plates 1a and 1b.

During the expansion step, as will be discussed in more detail below, areas of reduced pressure or cells 4 arise within the cross-section of the expanding blank. The side walls of the individual cells 4 are defined by rib-members 2'a of the expanded blank. The limits of cells 4 are defined by the contact points or areas of plates 1a and 1b and side walls 2'a. The reduced pressure in cells 4 is caused by the fact that each cell 4 tends to become a sealed chamber when the blank 2 fuses to the contact mold surfaces of plates 1a and 1b and, as the mold surfaces are pulled apart, the sealed cells 4 become enlarged, thus creating areas of reduced pressure. To prevent the higher ambient pressures from distorting or rupturing expanded walls 2'a of the blank, cells 4 of the blank are vented during the expansion step so as to equilibrate the pressure within such cells 4 with the ambient pressure outside the blank. This venting tends to preserve the pattern and the integrity of the resulting cross-sectional geometry of the expanded blank. In this embodiment of the present invention, the venting is accomplished through the open mesh configuration of the mold plates and the imperfect seal that exists between the surfaces of platens 3a and 3b and mold plates 1a and 1b.

After the platens have been expanded the desired distance they are cooled to a temperature which is below the heat distortion point of the plastic in the blank. The cooling may be allowed to occur in the ambient air, or by circulating a cooling medium through the platens, or by conduction through cooled platens, or by a combination of such procedures.

The mold plates may be readily disengagable from the rest of the press so as to allow another set of mold plates to be inserted and used in the press with another blank of thermoformable material while a previously used set of mold plates having an expanded blank therebetween is allowed to cool. The mold plate should also be disengagable from the rest of the press where the nature of the fusible blank and of the mold plate is such that the cooled expanded blank remains bonded to one or both of the mold plates. In th latter case laminates may be readily formed with the disengagable mold plates as skin laminae and the expanded blank as a core lamina. When such laminates are desired, similar or dissimilar mold plates can be used so as to provide laminates with similar or dissimilar skin lanimae, or even laminates wherein only one of the removable mold plates remains bonded to the cooled expanded blank.

Figure 5:
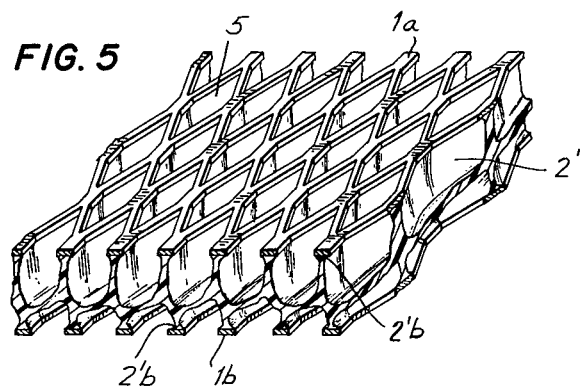
FIG. 5 shows an expanded structure made by the process disclosed in FIGS. 2-4.

FIG. 5 shows a cooled laminate structure 5 produced as described above with respect to FIGS. 1–4. The expanded and cooled plastic 2' remains bonded to plates 1a and 1b forming a rigid composite structural member 5. Rib members 2'a tend to have an I-beam configuration that has flanged members 2'b at the areas of contact with plates 1a and 1b. Expanded laminate structure 5 may be used as a relatively lightweight structural member as is, also the expanded core member 2' itself can be used as a structural member without the employment of metal plates 1a and 1b therewith.

For aesthetic, or other purposes, it may be desired to expand the cross-section of the blank in a non-uniform manner so as to provide expanded blanks which have cross-sectional areas of various degrees of thickness.

Figure 6:
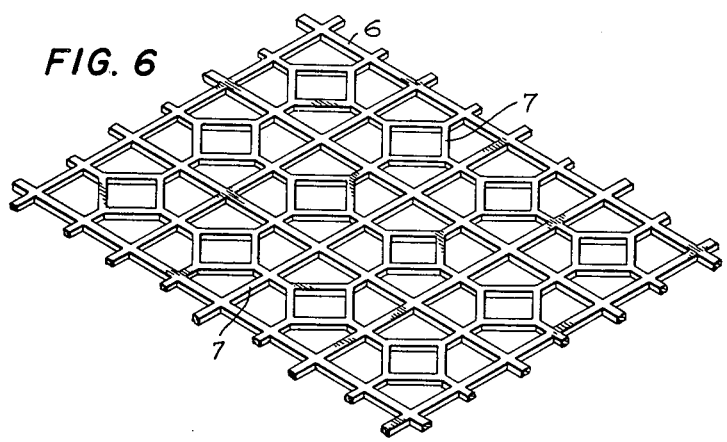
FIG. 6 shows a second type of removable mold plate having a perforated face.
Figure 7:
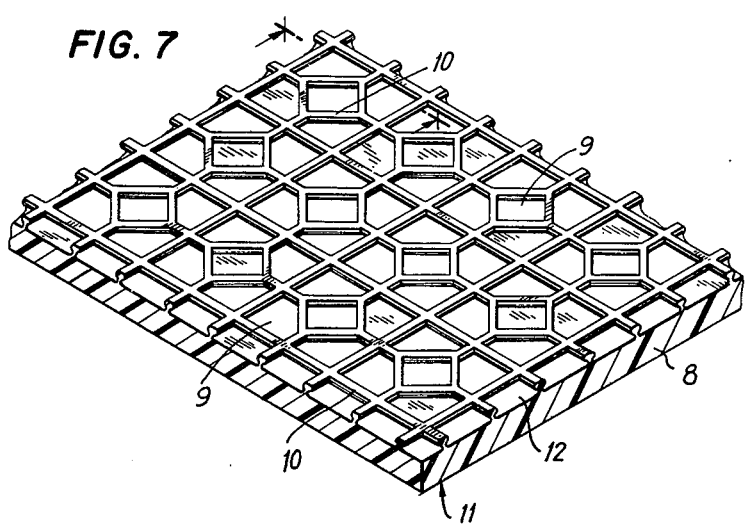
FIG. 7 shows an expanded structure made with one of the removable mold plates of FIG. 6.

FIG. 6 shows another type of removable mold plate 6 which may be used in the process of the present invention, and FIG. 7 shows an expanded blank 8 which may be prepared with mold plate 6. Mold plate 6 as shown in FIG. 6, is a sheet of metal which has a pattern of holes punched therein, leaving a pattern of ridge members 7 in the surface of said platen. With the holes cut through mold plate 6, either side of the mold plate may be used for contacting the fused plastic blank in the process of the present invention.

Figure 8:
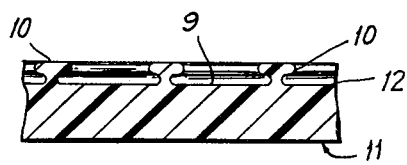
FIG. 8 shows an enlargement of the rib member of the expanded structure of FIG. 7.

In the preparation of the expanded blank 8 shown in FIG. 7, one removable mold plate 6 was used in a Carver press, in place of upper mold plate 1, as shown in FIG. 2. The mold plate 6 was mechanically affixed to upper platen 3a of the press. The flat surface of lower platen 3b of the press then served as the lower mold plate in this modification of the present invention. In preparing expanded blank 8, upper mold plate 6 is contacted with a fused blank 2 so as to cause the fused blank to wet, and adhere to by hot tack adhesion, the surfaces of ridge members 7 of mold plate 6, and the flat surface of the lower platen 3b. When the platens 3a and 3b of the press are then opened during the expansion step, the lower contact face of the blank remains adhered to the continuous face of lower platen 3b, while the blank is expanded through adherence to mold plate 6 at points of contact with ridge members 7. During the expansion step, voids are created in the expanding blank adjacent the holes in the surface of mold plate 6. These voids result in the formation of recessed areas or cells 9 in the expanded blank 8 and are bounded by expanded rib members 10 of the expanded blank. The cells 9 are vented, during the expansion step, through the holes in the surface of mold plate 6 and between the surface of platen 3a and mold plate 6 so as to maintain the uniformity and integrity of the resulting cross-sectional geometry of the resulting expanded blank. Upon being cooled below its heat distortion point, the expanded blank 8 may be removed from the press and mold plate 6. Expanded blank 8, thus has a flat side 11 and an expanded side 12. The expanded ridge members 10 of expanded blank 8 from a mirror image of ridge members 7 in the surface of mold plate 6. As shown in FIG. 8, each of these expanded ridge members 10 tends to have an I beam configuration. This I beam configuration is common for most, if not all, of the expanded rib members which are found in all of the modifications of the expanded articles made by the process of the present invention.

In the modification of the present invention shown in FIGS. 6 to 8, ridge members 10 of expanded blank 8 were expanded only a relatively short distance, so as to provide a type of embossed surface on the upper surface 12 of expanded blank 8. This embossing is not a true embossing, since the top surfaces of ridge members 10, as shown in FIG. 8, are undercut due to the I beam configuration of ridge members 10. This embossing effect can be used for decorative purposes on sheets of plastic intended for ornamental purposes or as a means of mechanically bonding or locking thereto other substrates or materials such as cement mortar, gypsum plaster or insulating bituminous cork mastic by means of the undercut features of the flanged tops of ridge members 10.

Ridge members 10 of expanded blank 8 can be further extended by pulling the mold plates further apart. The height to which ridge members 10 can be extended depends on several factors. Generally speaking, the height of ridge members 10 can be extended by increasing the surface area of the top surfaces of ridge members 10, which, in effect, is done by increasing the surface area of the contact surfaces of ridge members 7 of mold plate 6 shown in FIG. 6. Thus, ridge members 7 having larger surface areas will contact more of the surface of the blank to be expanded and thus allow more of the plastic in the blank to be pulled, during the expansion step, into the form of ridge members 10.

Figure 9:
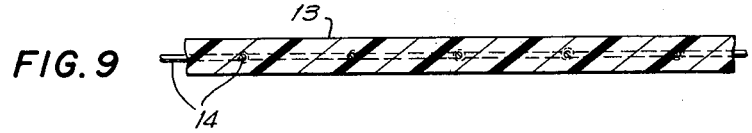
FIGS. 9 and 10 show the cross-sectional and top views, respectively, of a type of expandable blank that may be used in the present invention.
Figure 10:
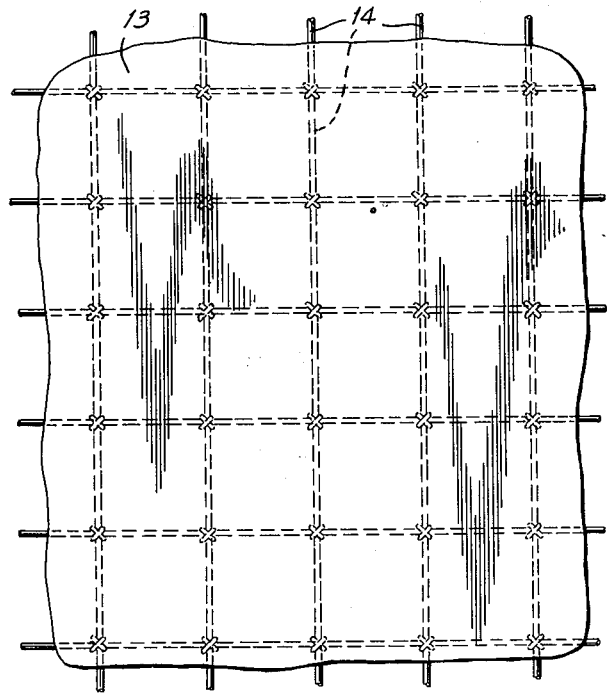
Figure 11:
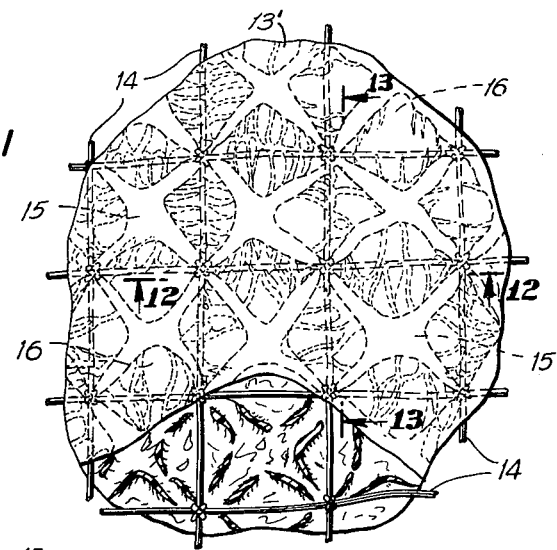
FIGS. 11 to 13 show top and cross-sectional views of an expanded structure made from the blank of FIGS. 9 and 10.
Figure 12:
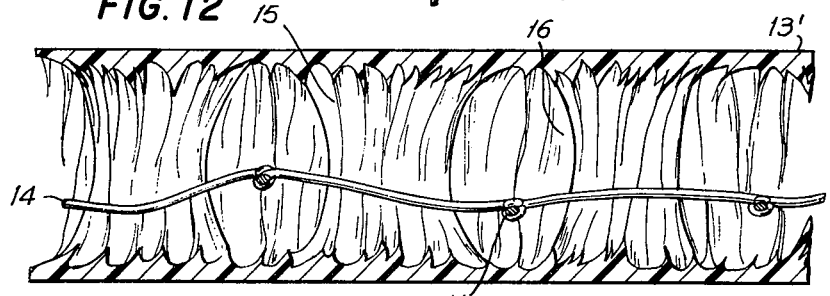
Figure 13:
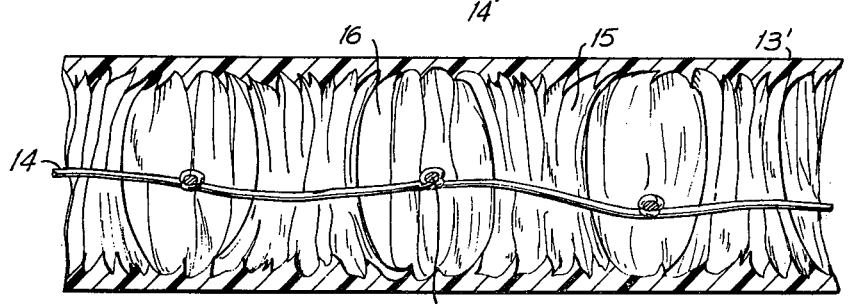

FIGS. 9 to 13 involve a further embodiment of the process of the present invention. FIG. 9 shows a side view, and FIG. 10 shows a top view of blank 13 which has been prepared from two sheets of plastic and a network of multistrand fiber 14. The blank 13 was prepared by fusing the network of fiber 14 between two sheets of plastic. Fiber network 14 extends outside blank 13. FIGS. 11 to 13 show blank 13 in expanded form 13'.

FIG. 11 shows a top view of blank 13' after it has been expanded according to the process of the present invention by hot tack adhesion between a pair of smooth surfaced mold plates such as the platens 3a and 3b of the Carver press shown in FIGS. 2–4. FIGS. 12 and 13 show side views through cross sections 12—12 and 13—13, respectively, of expanded blank 13'. FIGS.

11–13 show that expanded blank 13' has a fairly regular pattern of recurring, and relatively thin walled, I beam rib members 15 and relatively large void areas 16. The void areas 16 follow the pattern of the fiber network 14 and the I beam members tend to form within the rectangular areas defined by the intersecting parallel strands of fiber. The cross-section of the expanded blank thus shows a pattern of continuous void areas which follows the pattern of network 14, and a pattern of discontinuous rib members 15. When viewed from the top of expanded blank 13' the rib members 15 tend to have an X-shape configuration within each of the rectangular areas bounded by intersecting pairs of parallel strands of network 14. The pattern of the voids arises by virtue of the venting, during the expansion step in the process of the present invention, of the expanding blank through the multistrand fiber network 14. Fiber network 14 can be any made of any multistrand fiber, including inorganic and organic fibers such as glass fiber and cotton fiber.

Instead of using a multistrand fiber, other venting means can be used for venting the expanding blank from within, such as perforated piping or tubing or porous rods. The venting means can be removed from the expanded blank, or left in it, depending on the end use application. The venting means used in this embodiment is not restricted to one having a grid configuration as shown for network 14. Other configurations can be employed.

FIGS. 14 to 16 disclose a further type of expanded blank 17. The expanded blank 17 shown in FIGS. 14–16 was prepared from a solid sheet of thermoplastic resin having a Ta. The sheet was expanded by hot tack adhesion, as described above, between a pair of smooth faced platens such as platens 3a and 3b of a Carver press. The resulting voids 18 in the expanding plastic were vented through the sides 19 of the expanding blank during the expansion step in the process. This mode of venting gives rise to a random pattern of voids 18 and I beam rib configured members 20 in the expanded cross section. FIG. 14 thus shows a top view, and FIGS. 15 and 16 show side views through cross sections 15—15 and 16—16 respectively, of expanded blank 17 with its random pattern of voids 18 and rib members 20. Because of the random occurrence of rib members 20, expanded blank 17 would not have as much structural strength, and therefore as much utility, for load bearing purposes, as would an expanded blank of the same thickness, and made of the same plastic, which would have a regular pattern of rib members, as for example, expanded blank 13' as shown in FIGS. 11–13. Expanded blank 17, however, would have utility as a light weight expanded structural member which could be used for packaging purposes, i.e., as a relatively inexpensive cushioning member.

Figure 17:
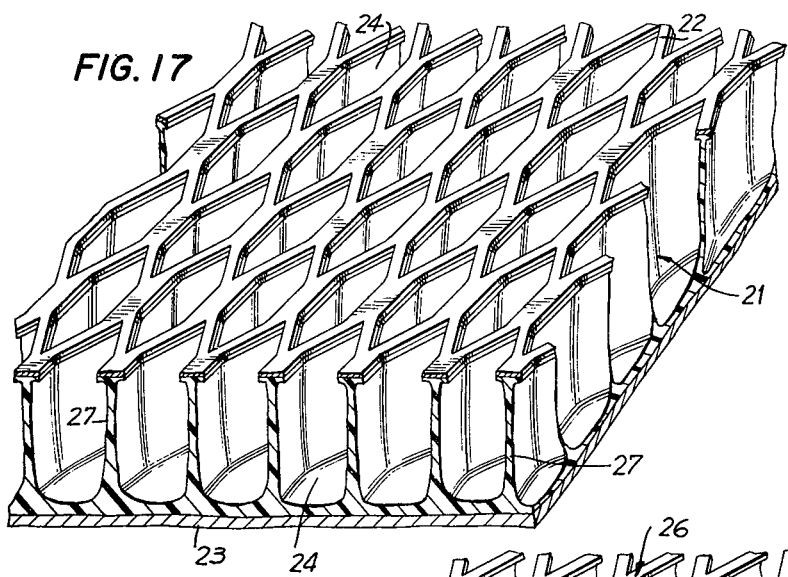
FIGS. 17 to 20 show two additional types of expanded blanks that may be made with the perforated mold plates shown in FIG. 1.
Figure 18:
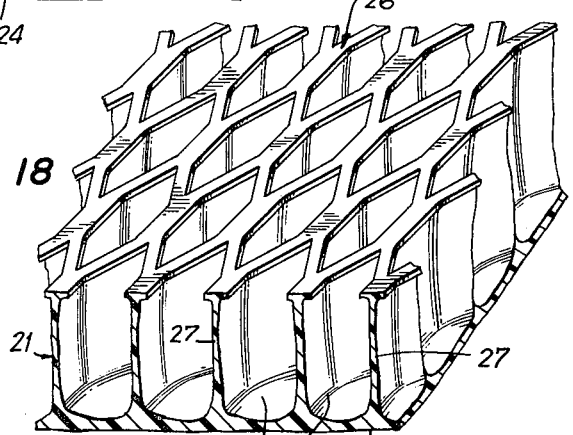

FIGS. 17 and 18 disclose a further type of expanded blank 21. FIG. 17 shows the blank after it has been expanded but before the mold plates are removed and FIG. 18 shows the expanded blank after the mold plates have been removed. The expanded blank 21 shown in FIGS. 17 and 18 was prepared from a solid sheet of plastic having a Ta. The sheet was expanded by hot tack adhesion, as described above, between a pair of mold plates. The upper mold plate 22 was a sheet of expanded metal similar to the sheet of metal mesh 1 shown in FIG. 1. The lower mold plate 23 was the smooth surfaced lower platen of a Carver press. The resulting voids 24 in the expanding plastic were vented through the openings in the face of mold plate 22 during the expansion step in the process. The resulting expanded blank 21 has a smooth continuous flat lower surface 25 and a top surface 26 which replicates the pattern of the mesh at the contacting surface of mold plate 22 and the plastic blank. The rib members 27 of the expanded blank have an I beam configuration. For the most part, the rib members 27 which form common walls between voids 24, maintain their uniformity and integrity during the expansion step and are not punctured.

Figure 19:
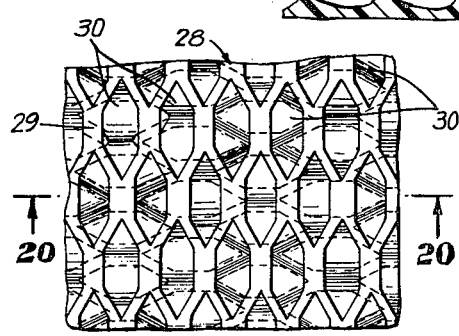
Figure 20:
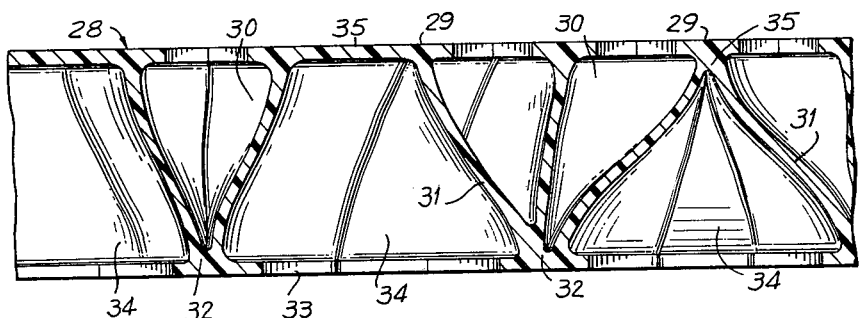

FIGS. 19 and 20 disclose another type of expanded blank 28 that may be made in a further modification of the process of the present invention. The expanded blank 28 shown in FIGS. 19 and 20 was prepared by expanding a sheet of plastic having a Ta, with the aid of hot tack adhesion as described above, between two expanded mesh mold plates of the type of platen 22 shown in FIG. 17. In this embodiment of the process of the present invention the faces of the mold plates which are to contact the plastic are arranged in the press so that one is at right angles, so to speak, to the other one. Thus, the diamond shaped pattern of the upper mold plate is turned 90° with respect to the diamond shaped pattern of the lower mold plate. FIG. 19 is a top view of the expanded blank 28 after the mold plates have been removed and FIG. 20 shows a cross-section of the expanded blank 28. The upper surface 29 of expanded blank 28 shows a replication of the mesh faced mold plate to which it adhered during the expansion step. Voids 30 are open at the face of top surface 29 and closed at the sides 31 and bases 32 thereof. The closed bases 32 of voids 30 are formed by the continuous mesh lower surface 33 of the expanded blank. Similarly voids 34 are open at the face of the lower surface 33 of the expanded blank and are closed at the sides 31 and apexes or tops 35 thereof. The closed tops of voids 34 are formed by the continuous mesh upper surface 29 of the expanded blank.

The sides or rib members 31 of the voids or cells 30 and 34 have an essentially I beam configuration. Each rib member 31 forms part of the side of both a cell 30 and a cell 34.

During the expansion step in the process the resulting voids 30 and 34 are vented through the openings in the top and bottom mesh platens, respectively.

Figure 21:
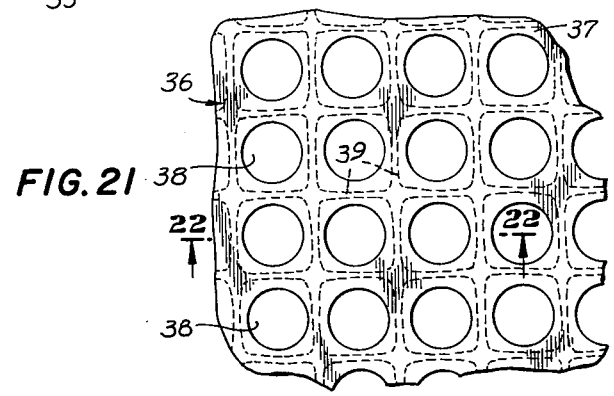
FIGS. 21 and 22 show a top and cross-sectional view of another type of blank made with perforated metal mold plates with evenly spaced round holes.
Figure 22:
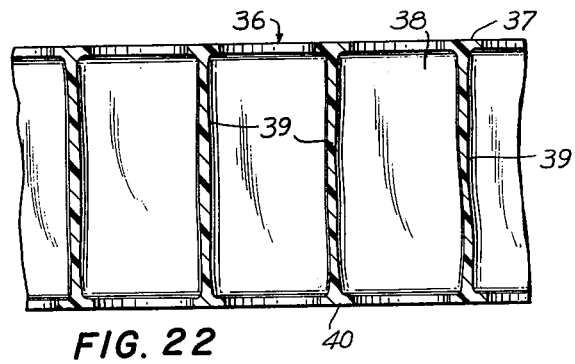

FIGS. 21 and 22 disclose another type of expanded blank 36 that may be made in a further modification of the process of the present invention. The expanded blank shown in FIGS. 21 and 22 was prepared from a solid sheet of plastic having a Ta. The sheet was expanded by hot tack adhesion, as described above, between a pair of mold plates. Each of the platens was a sheet of steel in which a series of regularly spaced and aligned rows of holes were punched. In each case the holes were completely punched through the mold plates. The holes were the same size in each of the mold plates and were spaced and aligned in the same pattern in each mold plate so that each plate was in effect, a copy of the other. When inserted in the Carver press as the top and bottom platens thereof the two platens were positioned so that each of the holes in the top plate was positioned directly over, and completely aligned with, a hole in the lower plate. FIG. 21 shows a top view of expanded blank 36. The top face 37 of expanded blank 36 provides a replication of the perforated surface of the upper mold plate of the press to which it adhered during the expansion step. FIG. 22 shows a cross-section of expanded blank 36. Expanded blank 36 provides a series of regularly shaped and spaced voids or cells 38 which are open at the top and bottom thereof. The cells are separated by I beam shaped rib members 39 along the sides thereof. The tops and bottoms of rib member 39 provide the continuous portion of the perforated top 37 and bottom 40 of the expanded blank. During the expansion step in the process the resulting cells 38 are vented through the perforations in the mold plates and the interface between the mold plates and the platens to ambient pressure.

Figure 23:
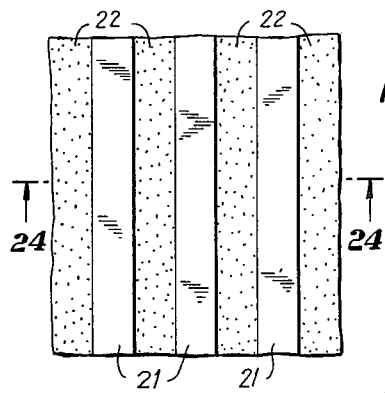
FIGS. 23-27 show two additional types of expanded blanks that may be made with mold plates having continuous faces.
Figure 24:
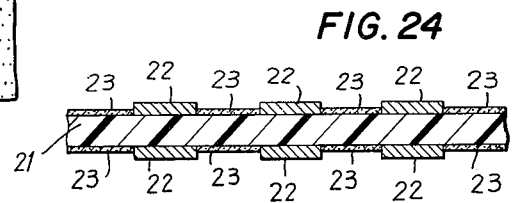
Figure 25:
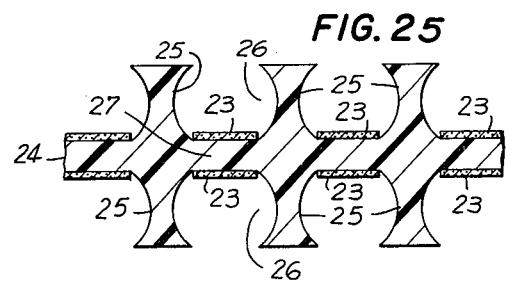

FIGS. 23 to 25 disclose the preparation of another type of expanded blank that may be made in a further modification of the process of the present invention. FIG. 23 shows the top 21 of a sheet of plastic on which have been placed a pattern of strips of adhesive tape 22 or other temporary masking means such as an overlay of a removable screen having a desired masking pattern therein. The temporary masking means is removed prior to the expansion of the blank 21, and the pattern of this masking means is designed to provide the pattern on the faces of the blank which are to be expanded. After the temporary masking means is in place a primary masking material is applied to those areas of the face of blank 21 which are not occupied by the temporary masking means.

Figure 26:
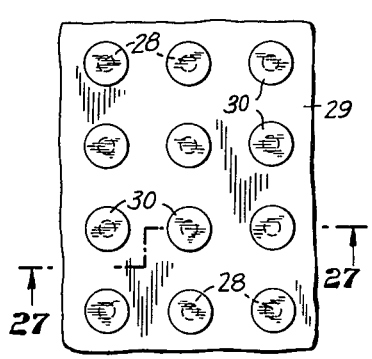
Figure 27:
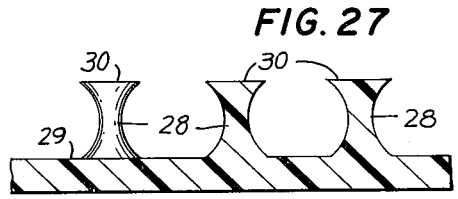

The primary masking means may be a fine coating of talc or clay or any other material which would prevent hot tack adhesion between the blank and the platens of the press. The primary masking means is left on the blank during the expansion step and is thus used to provide a pattern of areas on the surface of the blank which will not be expanded during the expansion step. After the primary masking means is in place, the temporary masking means is removed prior to the expanding of the blank in the press. FIG. 24 shows a cross-section of a sheet of plastic 21 which has been provided with a pattern of strips of temporary masking means 22 and primary masking means 23 on both sides thereof. When the temporary masking means are removed from blank 21 and it is expanded between the continuous surfaced platens of a press in accordance with the process of the present invention there results an expanded article 24 as shown in FIG. 25. The expanded article 24 has elongated ribs 25 which have an I beam configuration and which are expanded over the areas previously occupied by the temporary masking means 22. The strips of primary masking means 23 are still in place, they can be left there or removed. During the expansion step the resulting voids, in the form of channels 26 between rib members 25, are vented through the ends thereof, out the sides of the expanding blank. In this embodiment of the expanded blank the rib members 25 on the top and bottom faces of the expanded blank are all parallel to each other, with a thin, continuous, membrane or film 27 of the plastic therebetween. Expanded blanks of this type can be prepared wherein any pattern of the expanded rib members can be formed on either or both of the faces of the blank of plastic merely by the application of an appropriately designed primary masking means to the face or faces of the blank which are to be provided with the desired pattern of expanded rib members. If the desired pattern of expanded rib members in this modification of the expanded blanks is such as to prevent adequate venting of the void areas which are created during the expansion process through the sides of the expanding blank, then provision can be made for venting the voids through the face of the mold plates by using porous mold plates for such purpose. FIGS. 26 and 27, for example, show an expanded blank of this type which has a plurality of mushroom or I beam shaped expanded elements 28 protruding from one face of a sheet of plastic 29 and which can be made as disclosed in Example 21 below. FIG. 26 provides a top view of the expanded blank and FIG. 27 provides a cross-sectional view of the same expanded blank.

Figure 28:
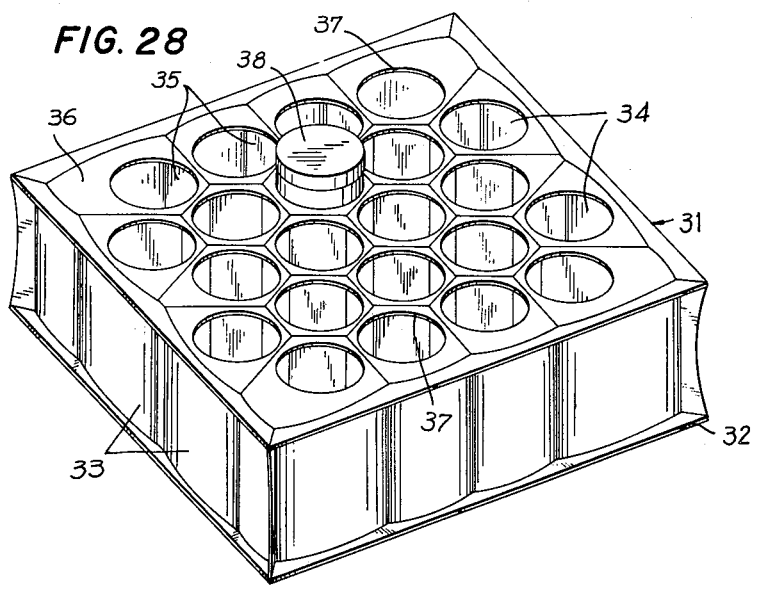
FIGS. 28 and 29 show a perspective and top view of a multicell container made with one mold plate of FIG. 40 and one continuous faced platen.
Figure 29:
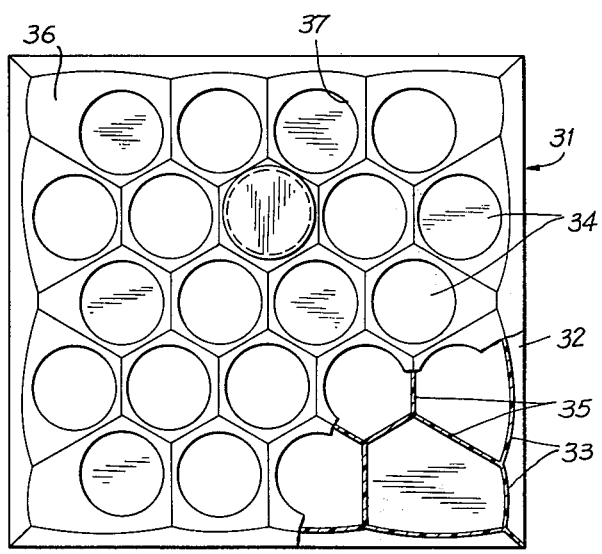

FIGS. 28 and 29 disclose another type of expanded blank which may be made in a further modification of the process of the present invention. The expanded blank 31 shown in FIGS. 28 and 29 was prepared from a solid sheet of plastic having a Ta. The sheet was expanded by hot tack adhesion, as described above, between a pair of mold plates. The lower mold plate was the continuous surface of the lower platen of a Carver press. The upper mold plate was a sheet of steel in which a series of regularly spaced perforations were punched. The perforations may have either or both of arcuate and straight sides. The perforations in the top mold plate which was used in preparing the expanded blank 31 were all circular in shape. The perforated mold plate used had the configuration shown in FIGS. 40–41 below. Each of the perforations formed the same sized circular hole. FIG. 28 provides a perspective view of expanded blank 31, which shows that the expanded blank 31 is a multicelled container.

Container 31 has a continuous smooth surfaced base 32, and continuous outside walls 33. Each of the cells 34 in the container is thus open at the top, and enclosed at the bottom thereof by base 32. Each of the cells are also enclosed on the sides, and separated from each other, by interior walls 35, alone, or in combination with outside walls 33. Interior walls 35 and exterior walls 33 have an I beam configuration. The cells whose walls are all interior walls are symmetrical and are hexagonal in shape. These may be termed interior cells. Those cells which have both interior and exterior walls may be termed exterior cells and these are not symmetrical in shape. The differences in the shapes of the cells arises due to the shape and spacing of the perforations in the top platen. The top 36 of the expanded blank 31 provides a replication of the surface of the perforated upper plate which was used to form the expanded blank. Thus the solid portions of the surface 36 of expanded blank 31 represent those areas of the blank which were in contact with the non-perforated areas of the upper mold plate during the expansion step in the process. Hexagon shaped interior cells are naturally formed when the perforations in the upper mold plate are completely circular, even though the lip members 37 form a circle that replicates the perforations in the upper mold plate. FIG. 29 shows a top view of expanded blank 31. The irregular shape of the outside cells is more clearly seen in FIG. 29, as compared to the regular, hexagonal shape of the interior cells. The irregularity of the shape of the exterior cells arises from the need the expanding cells to accomodate themselves to the shape of both the perforations in, and the outside edges of, the top mold plate during the expansion step inthe process of the present invention. Since lip members 37 tend to be flexible, a multicell container 31 can be used as a shipping and/or display carton for objects, such as jars, cans and vials, that can be snugly inserted in each cell, as shown by the insertion of a capped vial 38 in one of the cells in FIG. 28.

The hexagonal shape of the interior cells, and the irregular shape of the exterior cells, in expanded blank 31 is due primarily to the fact that the outer rows of perforations in the top mold surface were not subjected to balancing hot cohesive polymeric flow. This results from the fact that the position of the interior rows of perforations in the upper mold plate were staggered with respect to the positioning of the outside rows of perforations in the upper mold plate. If a single perforated mold plate were used wherein all the circular holes therein were aligned as in the platens used to form expanded blank 36 shown in FIGS. 21 and 22, then the resulting expanded blank would have regularly aligned square cells with a sealed base. Variation in the alignment and spacing of the perforations will thus produce variations in the shapes of the perforations will thus produce variations in the shapes of the resulting cells. However, even though circular perforations are used in the platens, the cells tend to have, for the most part, angular side walls.

During the expansion of the sheet of plastic to form expanded blank 31 cells 34 were vented through the perforations in the upper mold plate of the press.

Figure 30:
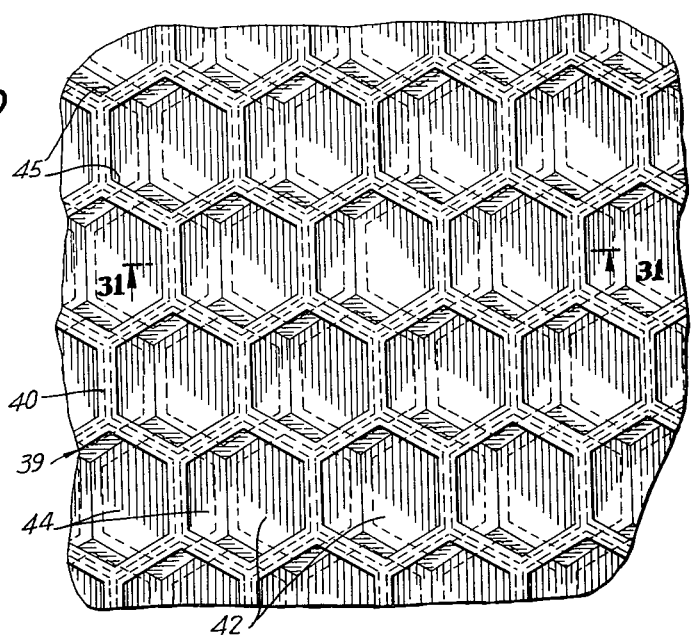
FIGS. 30 and 31 show a top and cross-sectional view of an expanded blank made with two of the perforated mold plates of FIGS. 35-37.
Figure 31:
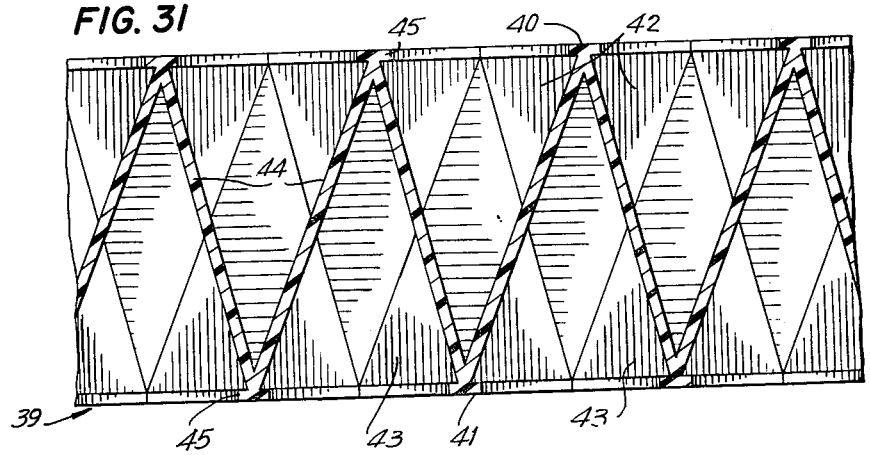

FIGS. 30 and 31 disclose another type of expanded blank 39 that may be made in a further modification of the process of the present invention. FIG. 30 shows the top view, and FIG. 31 shows a cross-sectional view of the expanded blank 39 which has a honey comb type structure. The expanded blank shown in FIGS. 30 and 31 was prepared from a solid sheet of plastic having a Ta. The sheet was expanded by hot tack adhesion, as described above, between a pair of the mold plates shown in FIGS. 35–37. Each of the mold plates was a sheet of aluminum ½ inch thick in which a series of regularly spaced and staggered rows of hexagonal shaped cavities were machined in one face (front) thereof. Each cavity was ¼ inch deep and had a diameter of 17/32 inch. In the center of each cavity there was then drilled a small vent hole which went out through the other face (back) of the plate. Each vent hole was 3/16 inch in diameter. The hexagonal cavities were thus the same size in each of the platens, and were spaced and aligned in the same pattern in each mold plate so that each mold plate was a copy of the other. When inserted in the Carver press as the top and bottom plates thereof, the two plates were positioned so that the holes in the top plate were not completely aligned with the holes in the lower plate. Although each row of perforations in the upper plate was aligned, in a vertical direction, with a row of perforation in the lower plate, the upper rows were shifted in a horizontal direction so that each of the perforations in the upper plate overlapped, in a vertical plane, about ⅓ of the area of one perforation, and about ⅔ of the area of a second perforation, in the lower plate. Other overlap patterns may also be used.

FIG. 30 shows a top view of expanded blank 39. The top face 40 of expanded blank 39 provides a replication of the perforated surface of the upper plate of the press to which it adhered during the expansion step. The lower face 41 of the expanded blank is a duplicate of such upper face. FIG. 31 shows a cross-section of expanded blank 39. Expanded blank 39 provides two sets of regularly shaped and spaced cells which are open at one end and sealed at the other end thereof. Each cell is conical in shape.

As shown in FIG. 31 one set 42 of such cells is open at the upper face 40 of blank 39, and sealed at the lower face 41 thereof, and the second set 43 of such cells is open at lower face 41, and sealed at upper face 40. The cells are separated by I beam shaped rib members 44. The rib members 44 defining each cell join together in an apex at the base of such cell to form a sealed base. The tops and bases of rib members 44 provide the continuous portion of the perforated top face 40 and base 41 of expanded blank 39. Lip members 45 which are present around the periphery of each cell 42 and 43 are not too pronounced because of the relatively close spacing and alignment of the perforations in the plates with which expanded blank 39 was prepared, and also because the perforations were angular and not circular or arcuate. The use of a circular or arcuate shaped perforation in the platens tends to produce a more pronounced lip member around the periphery of the cell openings in the expanded blank, as shown in FIGS. 21 and 28 and 29. A deformable or pronounced lip member is not necessarily advantageous in an expanded blank that is to be used as a load bearing member. The pronounced lip member would represent resin that was not being used to strengthen rib members 44, as in expanded blank 39, which would be the true load bearing elements of the expanded blank, when such blank were used for load bearing purposes, but does however, add to its flexural strength by providing a greater area to the discontinuous skin elements.

During the expansion of the sheet of plastic to form expanded blank 39 cells 42 and 43 were vented through the perforations in the upper and lower mold plates respectively, of the press.

Figure 32:
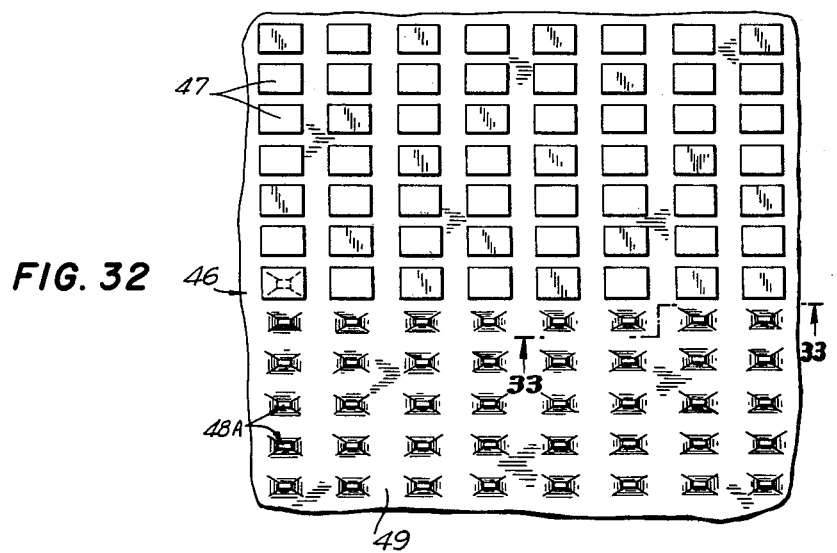
FIGS. 32 and 33 show the top and cross-sectional view of an expanded blank providing a bristled surface made with the mold plate of FIG. 34.
Figure 33:
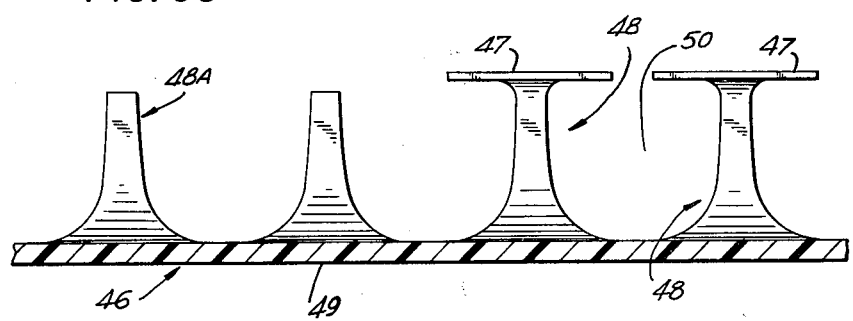
Figure 34:
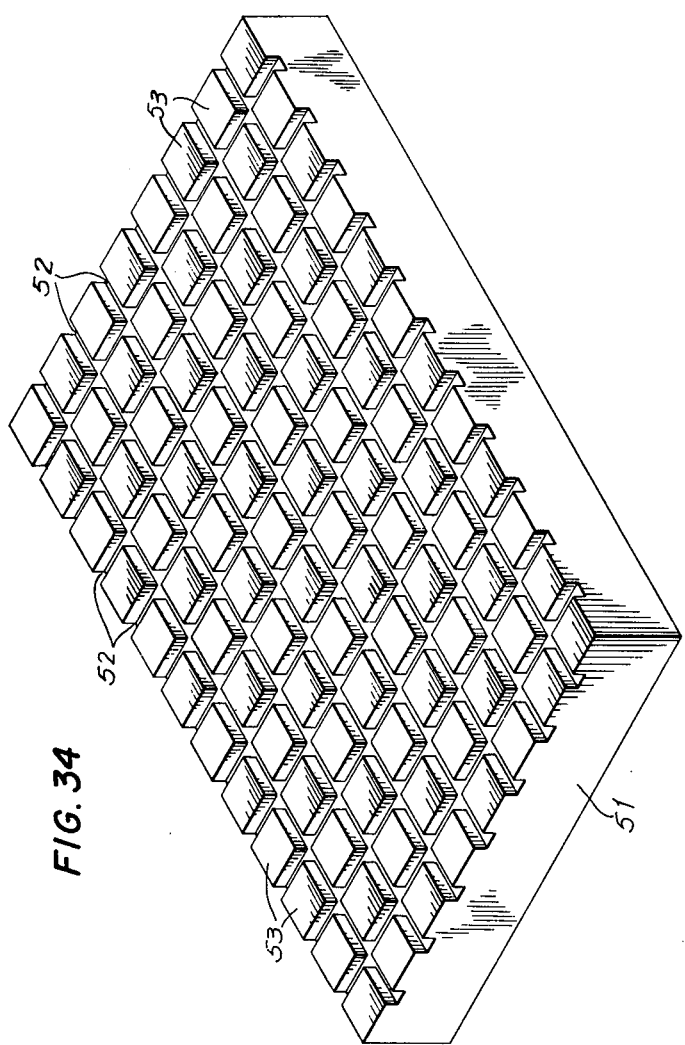
FIG. 34 shows a perspective view of a mold plate having a grid pattern of recessed channels in the face thereof.

FIGS. 32 and 33 disclose another type of expanded blank 46 which may be made in a further modification of the process of the present invention. The expanded blank shown in FIGS. 32 and 33 was prepared from a solid sheet of plastic having a Ta. The sheet was expanded by hot tack adhesion, as described above, between a pair of mold surfaces. The lower mold plate was the continuous faced surface of the lower platen of a Carver press. The upper mold plate was a sheet of aluminum, the contact surface of which resembled the face of a waffle iron. This mold plate is shown in FIG. 34. The contact surface of the upper mold plate was thus composed of a series of aligned rows and columns of rectangles of metal surface each rectangle being separated from the others by recessed channels or grooves that ran the length and width of such top mold plate. FIG. 32 shows a top view, and FIG. 33, provides a cross-sectional view, of expanded blank 46, after the expanded blank was removed from the press and subjected to a further process step as will be described below. The top view of expanded blank 46, as shown in FIG. 32, provides a partial replication of the pattern of contact surfaces of the upper mold plate of the press to which it adhered during the expansion step. This pattern is shown replicated in the pattern of columns and rows of rectangular shaped head members 47 depicted in the upper half of expanded blank 46 in FIG. 32. Each of these rectangles 47 is the head of an expanded I beam shaped rib member 48 as shown in cross-section in FIG. 33. The base 49 of expanded blank 46 is a continuous film of plastic which forms the base for each and every rib member 48. During the expansion step in the process, the resulting voids, in the form of channels 50 between expanding rib members 48, are vented through the ends thereof, out the sides of the expanding blank.

After the expansion operation the head members 47 of some of the rib members 48 were removed so as to provide bristle like members 48A as shown in FIGS. 32 and 33.

The expanded blank 46 shown in FIGS. 32 and 33 can be used for the preparation of bristled objects such as artificial turf, brushes, scraping devices and cushioning material. The head members 47 can be removed from, or left on, rib members 48, for all of these applications.

FIG. 34 shows a perspective view of a top mold plate 51 which resembles the face of a waffle iron and which was used in the process of the present invention to make the expanded article shown in FIGS. 32–33. Mold plate 51 has a series of interconnected recessed channels or grooves 52 cut into the top of such plate. Elevated areas 53 at the top surface of mold plate 51 are defined by the grid-like pattern of channels 52, and elevated areas 53 serve as the blank contact surface of mold plate 51. Channels 52 serve as channel means. The channel means need not be used in a grid pattern. The channel means can be a series of parallel channels or grooves running in one direction across the face of mold plate 51. In the top mold plate 51 shown in FIG. 34 contact surfaces comprise a series of aligned rows and columns of rectangles, with each rectangle being separated from the others by recessed channels or grooves 52 that run the length and width of the top surface of mold plate 51.

Figure 35:
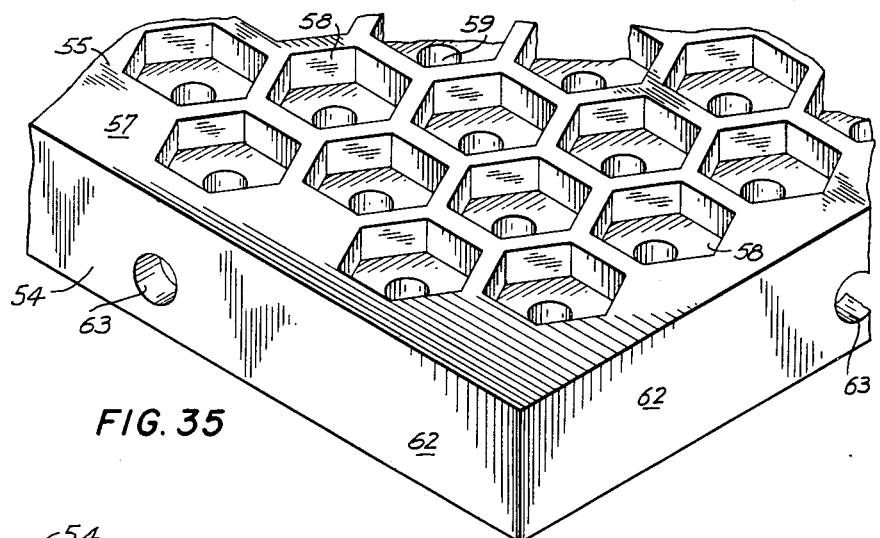
FIG. 35 shows a partial top view in perspective.
Figure 36:
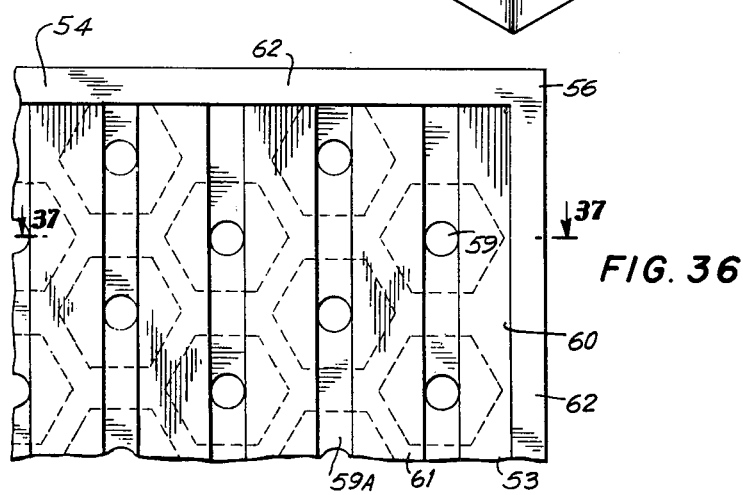
FIG. 36 shows a partial view of the reverse side.
Figure 37:
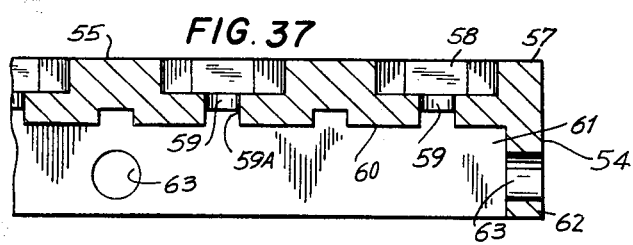
FIG. 37 shows a partial cross-sectional view of a perforated mold plate having hexagonal perforations in the face thereof.

FIG. 35 shows a partial top view in perspective, FIG. 36 shows a partial view of the reverse side, and FIG. 37 shows a partial cross-sectional view, of another type of mold plate 54 which has a series of recessed cavities therein as perforations and which was used as a mold plate in the process of the present invention to make the expanded article shown in FIGS. 30–31. Mold plate 54 has a top sheet 55 of metal mounted on a hollow U-shaped frame 56. In the front face 57 of the sheet 55 a series of regularly spaced and staggered rows of hexagonal shaped perforations 58 were machined. Each of the hexagonal perforations 58 was only machined about half way through top sheet 55. In the center of the base of each of the hexagonal perforations 58 there was then drilled a small circular vent hole 59 through the remainder of sheet 55 and which exited out the other (back) face 60 of sheet 55. The circular vent holes 59 were about a third of the diameter of the hexagonal perforations 58. The hexagonal perforations 58 were all the same size. Vent holes 59 open out the back face 60 of sheet 55 into a hollow area 61 bounded by the three legs 62 of U-shaped frame 56. Channels 59A are provided in the back-face 60 of sheet 55 to link each column of vent holes 59 to facilitate venting therethrough. Screw holes 63 are also provided in the walls of legs 62 for fastening mold plate 54 to the Carver press. Two of these mold plates 54 were used in a Carver press as described above to prepare the expanded blanks shown in FIGS. 30–31 and 38–39. Venting of the back of the mold plate to the outside of the plate is accomplished through the open wall of U-shaped frame 62, which is not shown.

When inserted in the Carver press as the top and bottom plates thereof, for the preparation of the expanded articles shown in FIGS. 30–31 and 38–39, the two plates 54 were positioned and aligned so that that the two front faces 57 thereof faced each other and the hexagonal perforations 58 in the top plate were not completely aligned in the vertical plane, with the hexagonal perforations 58 in the lower plate. The hexagonal perforations 58 in the upper plate were positioned so that each of the perforations in the upper plate overlapped, in a vertical plane, two or more of the hexagonal perforations in the lower plate.

Figure 38:
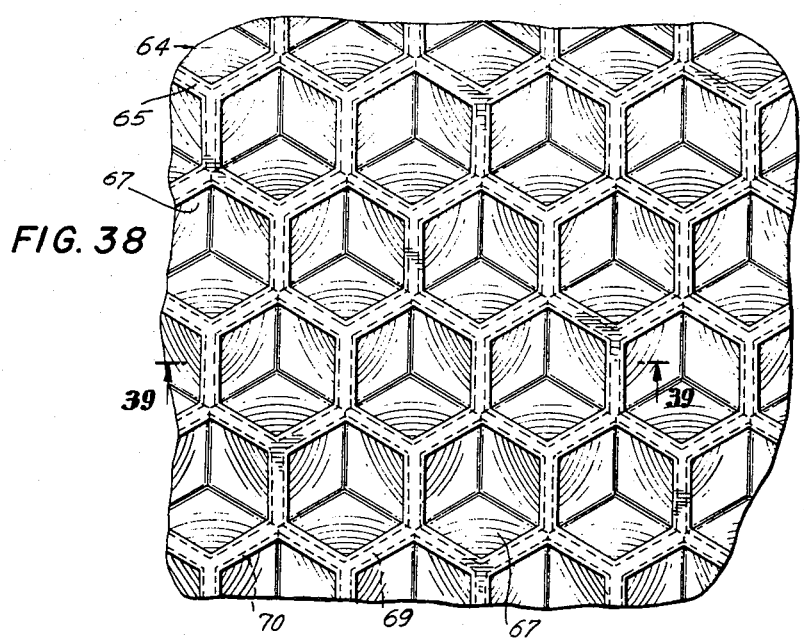
FIGS. 38 and 39 show the top and cross-sectional views of another expanded blank made with two of the mold plates of FIGS. 35-37.

FIG. 38 shows a top view of expanded blank 64. Expanded article 64 was prepared by expanding a sheet of thermoplastic material between a pair of the mold plates of FIGS. 35–37. The top face 65 of expanded blank 64 provides a replication of the perforated surface of the upper plate of the press to which it adhered during the expansion step. The lower face 66 of the expanded blank is a duplciate of such upper face 65 and provides a replication of the perforated surface of the lower mold plate of the press to which blank 64 adhered during the expansion step. FIG. 38 thus shows that the alignment and positioning in the press of the two mold plates 54 that were used to prepare expanded blank 64 was such that each horizontal row of perforations 58 in the upper mold plate was aligned, in a vertical plane, with two of the horizontal rows of perforations 58 in the lower mold plate in such a way that each of the perforations 58 in the upper mold plate overlapped three adjacent perforations 58 in the lower mold plate. Each of the perforations 58 in the lower mold plate was overlapped to the same extent, in terms of overlapped surface area. This can be accomplished by first aligning each horizontal row of perforations 58 in the upper mold plate with a horizontal row of perforations 58 in the lower mold plate, and then shifting the upper mold plate on its X-axis, with respect to the X-axis of the lower mold plate, so that each perforation 58 in the upper mold plate overlaps two adjacent perforations 58 in the lower mold plate, and then further shifting the upper mold plate on its Y-axis, with respect to the Y-axis of the lower mold plate, so that each perforation in the upper mold plate overlaps a portion of three adjacent perforations 58 in the lower mold plate, with such latter three perforations in the lower mold plate including the two perforations 58 in the lower mold plate that were overlapped in the first shifting step. The shifting of the two mold plates with respect to each other can be such that one or the other, or both of the plates are shifted in their X and/or Y-axis with respect to each other to accomplish the desired overlapping of the perforations in the two plates. The sequence of steps involved in the aligning and shifting of the mold plates is not critical. This is accomplished before the blank is inserted between the aligned and positioned mold plates.

Figure 39:
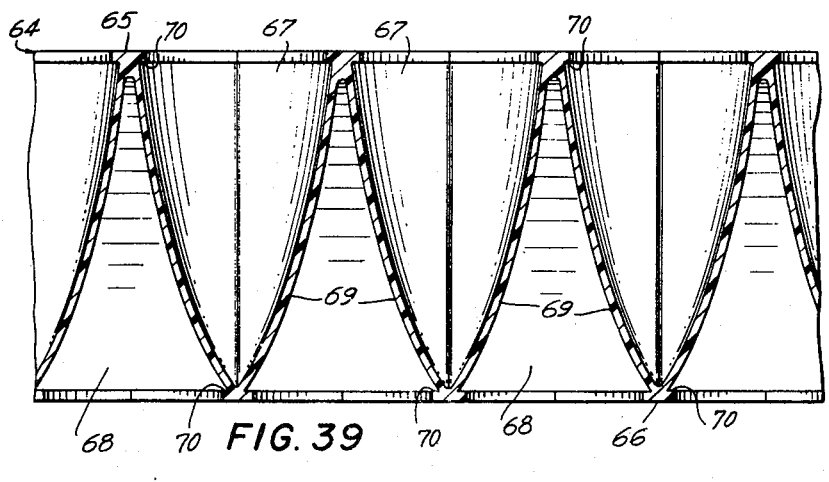

FIG. 39 shows a cross-section of expanded blank 64. Expanded blank 64 also provides two sets of regularly shaped and spaced cells which are open at one end and sealed at the other end thereof. Each cell is conical in shape. As shown in FIG. 39 one set 67 of such cells is open at the upper face 65 of blank 64, and sealed at the lower face 66 thereof, and the second set 68 of such cells is open at lower face 66, and sealed at upper face 65. The cells are separated by I beam shaped rib members 69. The rib members 69 defining each cell join together in an apex at the base of such cell to form a sealed base. The tops and bases of rib members 69 provide the continuous portion of the perforated top face 65 and base 66 of the expanded blank 64. Lip members 70 which are present around the periphery of each cell 64 and 68 are not too pronounced because of the relatively close spacing and alignment of the perforations in the plates with which expanded blank 64 was prepared, and also because the perforations were angular and not circular or arcuate.

During the expansion of the sheet of plastic to form expanded blank 64 cells 67 and 68 were vented, in turn, through the perforations 58, vent holes 59 and channels 59A and the open wall of U-shaped frame 62 in the upper and lower mold plates 54 of the press.

Figure 40:
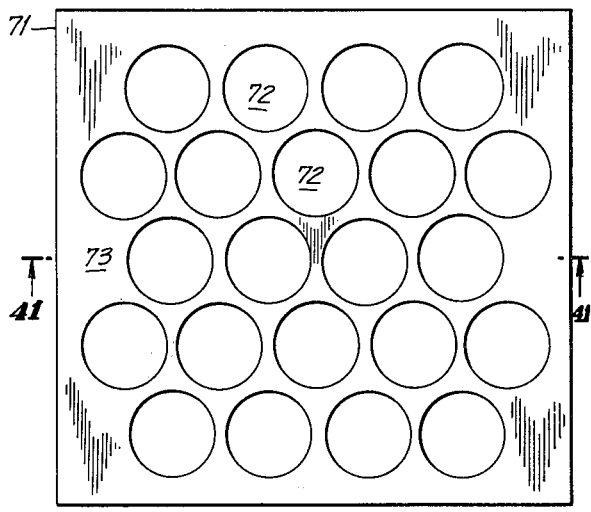
FIGS. 40 and 41 show the top and cross-sectional views of a perforated mold plate having circular perforations therein.
Figure 41:

FIG. 40 shows a top view and FIG. 41 shows a cross-sectional view of the type of perforated mold plate 71 which was used in the process of the present invention in preparing the expanded article shown in FIGS. 28–29. Perforated mold plate 71 is a thin sheet of material such as aluminum or steel in which a series of regularly spaced perforations 72 are punched, so as to provide a pattern of staggered rows and columns of such perforations. The perforations may have either or both of arcuate and straight sides. The perforations 72 in mold plate 71 are all circular in shape. Each of perforations 72 are the same size circular perforation, with the various perforations being separated from each other by the continuous portion 73 of the surfaces of mold plate 71. Perforations 82 function as the perforation means discussed above, and the continuous surface 73 of mold plate 71 provides the mold plate contact surface which will contact the contact surfaces of the blank during the expansion process.

Figure 42:
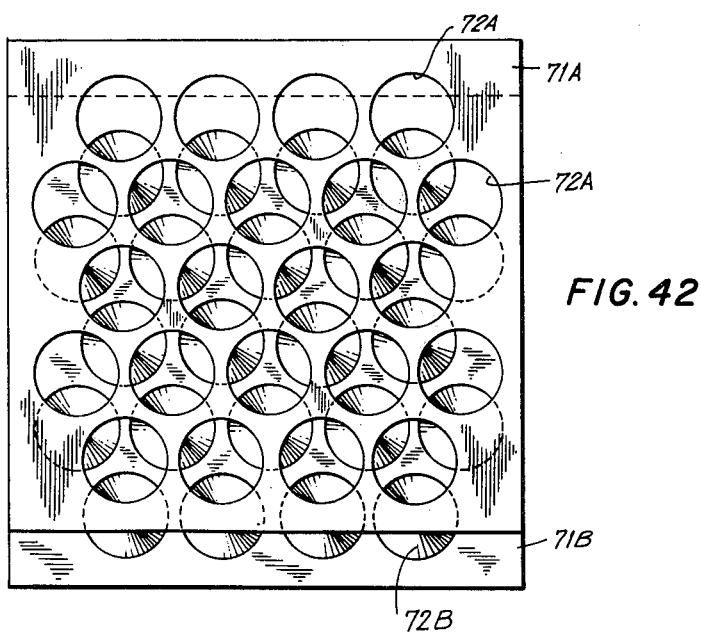
FIG. 42 shows two of the mold plates of FIGS. 40-41 arranged one over the other in a nonaligned position.

FIG. 42 shows a top view of two mold plates 71, one positioned over the other. The position of the two plates with respect to each other, in the vertical plane, is such that the perforations in the two plates are not aligned. Thus each of the perforations 72A in the upper plate 71A overlap, in such vertical plane, one or more of the perforations 72B in the lower plate 71B. This pattern of overlap is occasioned by the size, shape, and spacing (staggering) of the rows and columns of perforations in each plate, as well as by the positioning of one plate, in the vertical plane, with respect to the other. This same pattern of overlap will prevail in the horizontal plane, if the position of the two mold plates with respect to each other is maintained, and they are both stood side by side on one of their thin edge sides.

Figure 43:
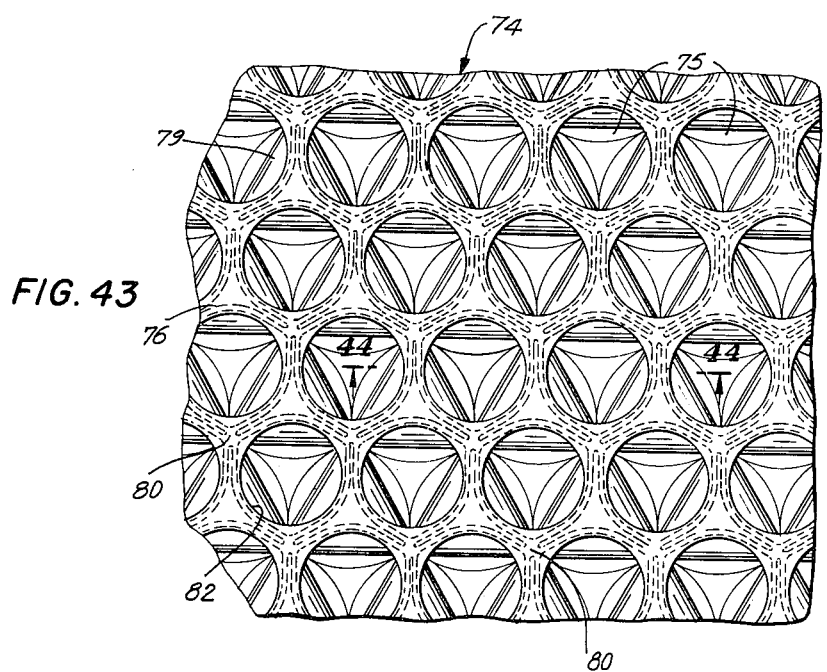
FIGS. 43 and 44 show the top and cross-section views of an expanded blank made with two of the mold plates of FIGS. 40-41 arranged as in FIG. 42.
Figure 44:
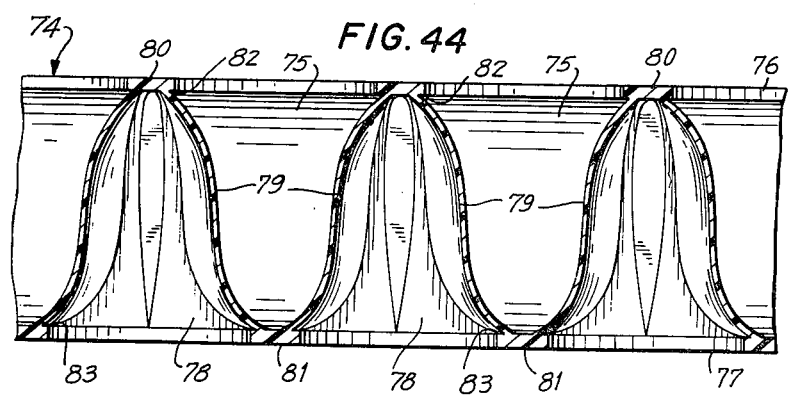

FIG. 43 shows a section of a top view, and FIG. 44 shows a section of a cross-sectional view of expanded blank 74, which has been produced by the process of the present invention. Expanded blank 74 was produced by expanding a sheet of thermoplastic material between a pair of the mold plates of FIGS. 40–41 aligned as shown in FIG. 42. Blank 74 is shown after it has been removed from the press and the mold plates. Expanded blank 74 has two sets of regularly shaped and spaced cells which are open at one end and sealed at the other end thereof. Each cell is conical in shape. As seen in FIGS. 43–44 one set 75 of the cells is open at the upper face 76 of blank 74, and sealed at the lower face 77 thereof, and the second set 78 of such cells is open at the lower face 79 and sealed at the upper face 76. The cells are separated by I beam shaped rib members 79. The rib members 79 defining each cell join together in an apex at the base of such cell to form a sealed base. The tops and bases of rib members 79 provide the continuous portions 80 and 81 of the perforated top face 76 and base 77, respectively, of expanded article 74. The top face 76 of expanded article 74 provides a replication of the blank contact surface of upper mold plate 71A to which it adhered during the expansion step. Thus the open ends of upper cells 75 replicate perforations 72 of mold plate 71A, and continuous portions or areas 80 of the top face of expanded blank 74 replicate the continuous areas 73 of mold plate 71A. In a similar manner the continuous surface 81 of lower face 77 of expanded blanks 74 provides a replication of the blank contact surface of lower mold plate 71B. As seen in FIG. 43, each of the circular open ends of upper cells 75 overlaps, in the vertical plane, about three of the circular open ends of the lower cells 78 in the expanded blank. FIG. 44 shows that side walls 79 of the cells tend to be rotund, rather than flat. FIG. 43 shows lip member 82 around the opening of each cell 75, and FIG. 44 shows lip members 82 and 83 at the openings of cells 75 and 78, respectively.

Figure 45:
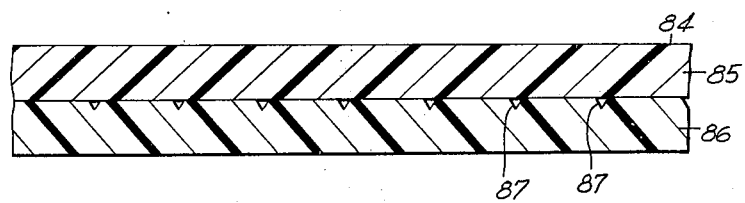
FIG. 45 shows a cross-section of an expandable blank of thermoplastic material having a series of V grooves therein.
Figure 46:
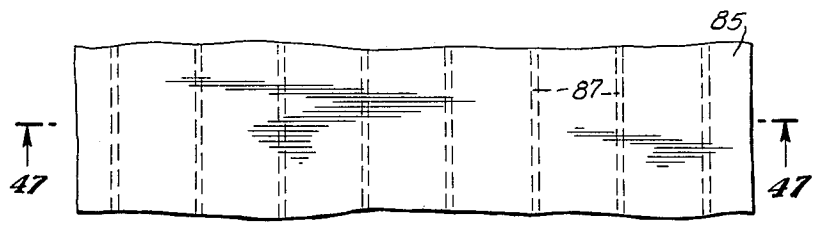
FIGS. 46 and 47 show a top and cross-sectional view of an expanded article made with the blank of FIG. 45 in the process of the present invention.
Figure 47:
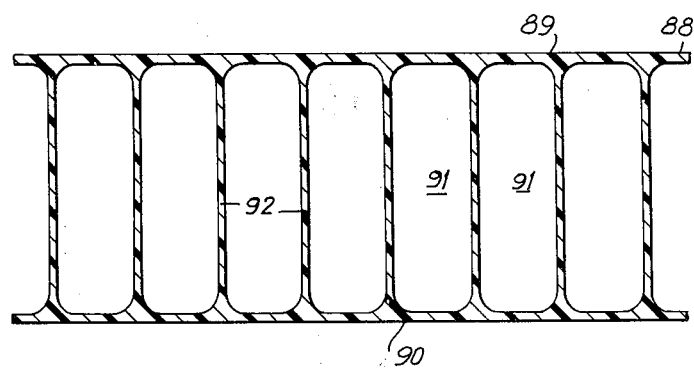

FIG. 45 discloses a cross-sectional view of a blank 84 which is used in the preparation of the expanded article 88 shown in a top view in FIG. 46 and in cross-section in FIG. 47. Blank 84 shown in FIG. 45 consists of a continuous sheet of thermoplastic material 85 which has two smooth faces, on top of a second continuous sheet of thermoplastic material 86. Sheet 86 has a continuous smooth lower surface. The upper surface of sheet 86 has a series of V-shaped grooves 87 therein. The grooves 87 are parallel to each other, and run the length of sheet 86. Prior to expanding blank 84, a masking means such as powdered clay is applied to the surfaces of the V-shaped grooves 87. Blank 84, with the masking means in grooves 87, is expanded to form expanded blank 88 between two continuous smooth surfaced platens or mold plates in a Carver Press. After the blank 84 is inserted in the press the hot mold plates or platens are used to slightly compress the blank, and fuse sheet 85 to sheet 84, and cause the composite fused blank to wet and adhere to the contact surfaces of the mold plates or platens. The fusion of sheet 84 to sheet 85, at the interface thereof, is continuous except at those strips of such interface which are adjacent the masked V-grooves 87 in sheet 86. The masking means prevents fusion or adhesion of sheet 85 and sheet 86 where such masking means is present.

FIG. 46 shows a top view and FIG. 47 shows a cross-sectional view of expanded article 88 after the expansion step in the process, and after the expanded article has been removed from the molds. During the expansion step upper surface 89 of article 88 adhered to the contact surface of the upper mold plate of the press, and lower surface 90 of article 88 adhered to the contact surface of the lower mold plate of the press. Cells 91 arise in the cross-section of the expanding plastic during the expansion step, and they are essentially rectangular in shape, and are separated from each other by I-beam shaped wall members 92, and such wall members 92 and cells 91 run the length of article 88. The cells 91 were vented out the ends thereof during the expansion step. Each cell 91 arose at the site of each masked V-groove 87.

Figure 48:
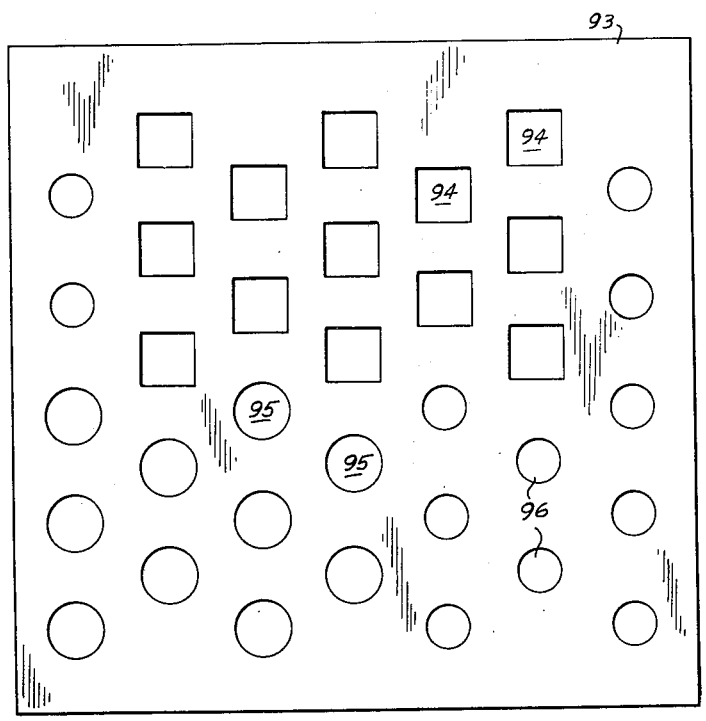
FIGS. 48 and 49 shows another perforated mold plate, alone, and aligned with a mold plate of FIGS. 40-41, and FIGS. 50-52 show an expanded blank made with the aligned mold plates.

FIG. 48 shows a top view of another type of thin mold plate 93 which may be used in the process of the present invention. Mold plate 93 has a series of three different shaped or sized perforations punched therein, squares 94, large circles 95 and small circles 96. Squares 94 has a slightly larger surface area than circles 94, which have a larger surface area than circles 96. As shown in FIG. 48, all the perforations are arranged in ordered columns in one, or the vertical direction, and in a staggered array in the other, or horizontal direction. All of the squares are the same size, as are all the large circles, and the small circles.

Figure 49:
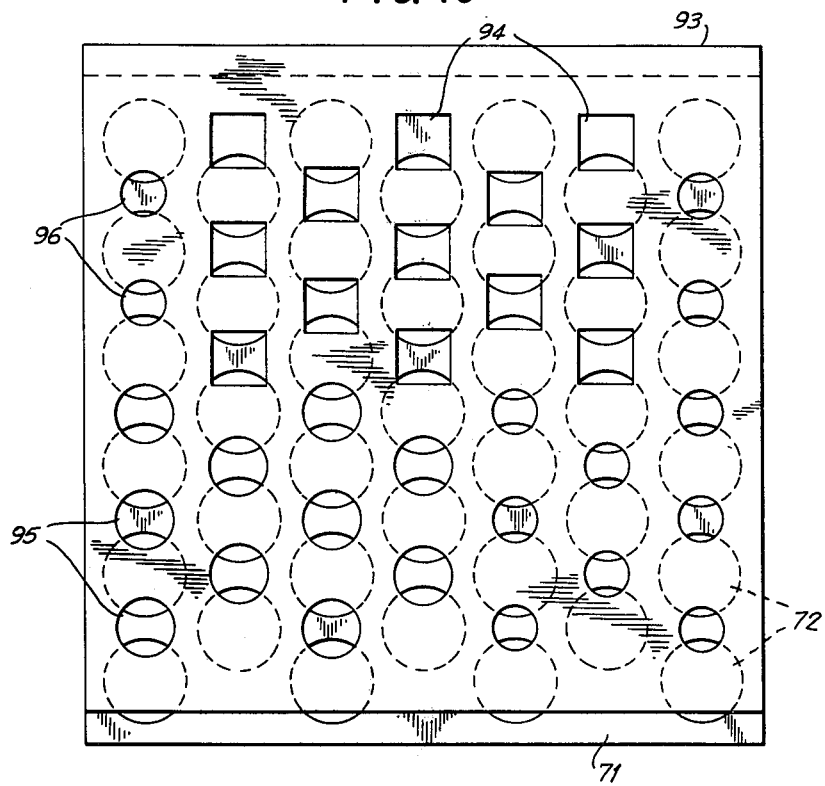

FIG. 49 shows, a top view of a mold plate 93 positioned above a mold plate 71 of FIGS. 40–41 in one alignment of such plates with respect to each other which may be used in the process of the present invention. In the alignment of mold plates 71 and 93 shown in FIG. 49, mold plate 71 is in position to be used as a lower mold plate, and mold plate 93 is in position to be used as an upper mold plate. The perforations 72 in lower mold plate 71 are all larger in area than any of the three perforations 94, 95 and 96 in mold plate 93. The distance between any two adjacent perforations in each vertical column of the perforations in upper plate 93 varies but is always less than the diameter of perforations 72 in lower mold plate 71, all of which perforations 72 have the same diameter. Each vertical column of perforations in upper mold plate 93 is aligned with a vertical column of perforations in lower mold plate 71, and in the vertical plane, each of the perforations 72 in lower mold plate 71 is overlapped with two of the perforations in upper mold plate 93.

Figure 50:
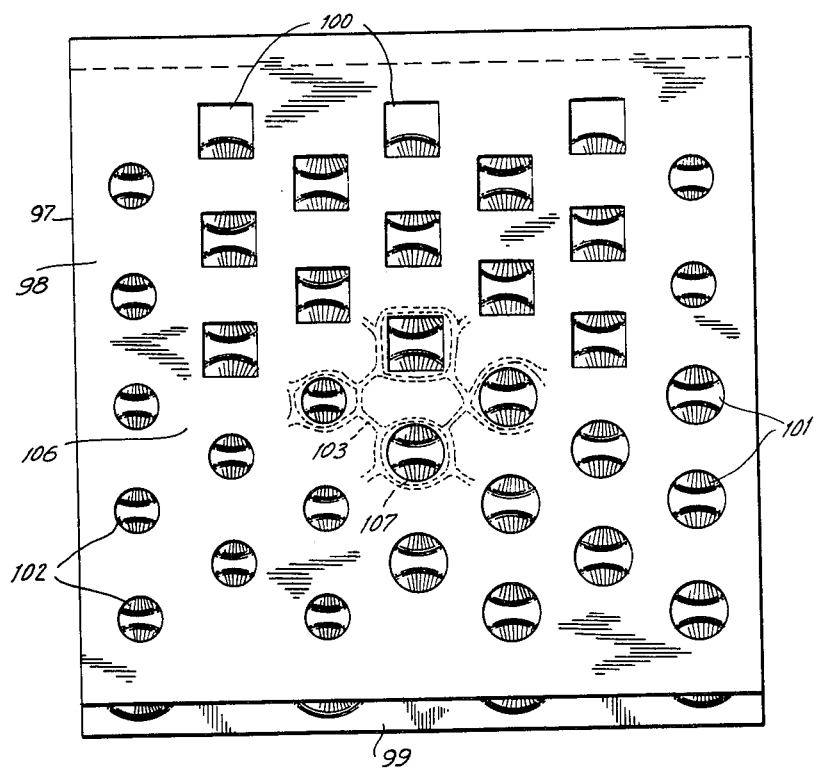
Figure 51:
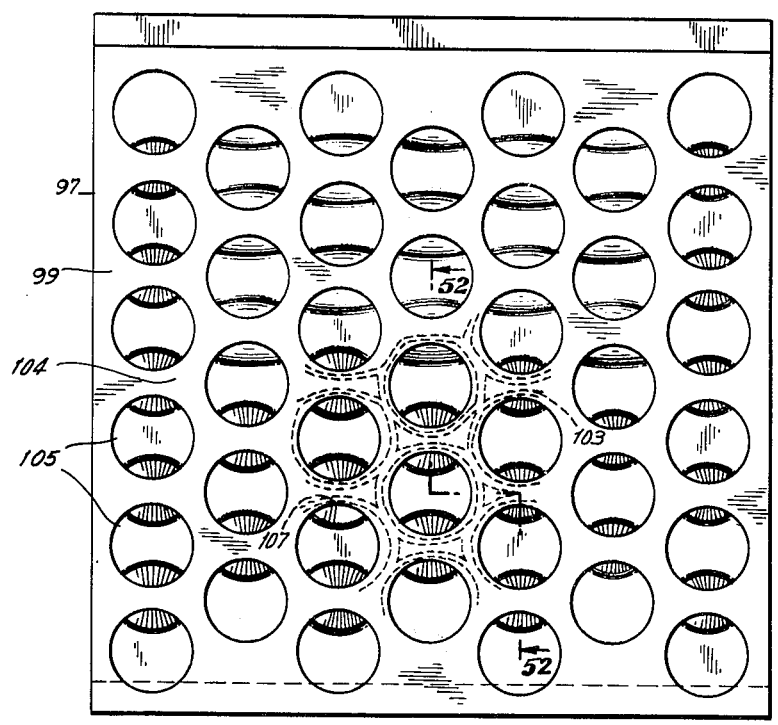
Figure 52:
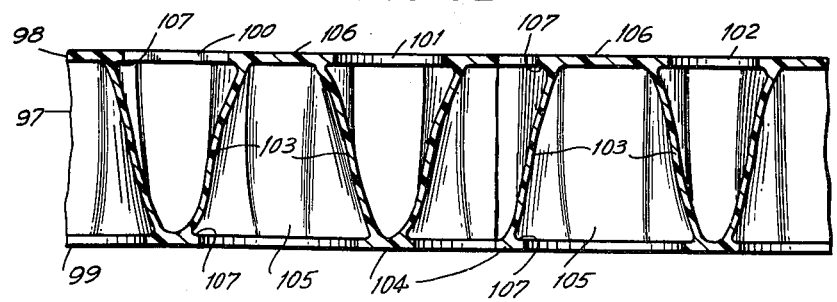

FIG. 50 shows a top view, FIG. 51 shows a bottom view, and FIG. 52 shows a cross-sectional view, of an expanded blank 97 made with the aligned mold plates 71 and 93 as shown in FIG. 49. The expanded blank 97 shown in FIGS. 50-52 was thus prepared by expanding a sheet of plastic having a Ta, with the aid of hot tack adhesion as described above, between a pair of mold plates 71 and 93 arranged as shown in FIG. 49. The upper surface 98 of expanded blank 97 shows a replication of mold plate 93 to which it adhered during the expansion step. The lower surface 99 of expanded blank 97 shows a replication of mold plate 71 to which it adhered during the expansion step. Voids 100, 101 and 102 in upper surface 98 have the square, the larger circle and the smaller circle, respectively, shaped openings shown in surface 98 and are open at upper surface 98 and closed at sides 103 and bases 104 thereof. The sealed based 104 of voids 100, 101 and 102 are formed by the continuous portion of lower surface 99. Voids 105, with circular shaped openings, are open at the face of lower surface 99 of blank 97 and are sealed at the sides 103 and apexs or tops 106 thereof. The sealed tops of voids 105 are formed by the continuous portions of upper surface 98 of the blank.

The common side or rib members 103 of the voids or cells 100, 101 and 102 on the one hand, and cells 105 on the other hand, have an essentially I beam configuration. Each rib or wall member 103 forms part of the side of both a cell 105, and one or more of cells 100, 101 and 102.

Continuous lip members 107 which are present around the periphery of the openings of each cell 100, 101, 102 and 105 are more pronounced around the circular peripheries of cells 101, 102 and 105 than around the rectangular periphery of cells 100.

Cells 100, 101, 102 and 105 are generally all of the same height but their volumes are of the order of 102 < 101 < 100 < 105, and the relative size of the volumes of such cells is a function of the relative size of perforations 96, 95, 94 and 92, respectively. Cells 100, 101 and 102 tend to be more conical in shape, than cells 105, whereas cells 105 tend to be more cylindrical in shape than cells 100, 101 and 102. The sealed ends of all of these cells, however, tend to be narrower than the open ends thereof.

During the expansion step in the process, the resulting voids 100, 101, 102 and 105 are vented through the perforations 94, 95, 96 and 72 respectively in the upper and lower mold plates, and also through the imperfect seal that exists between the surfaces of such mold plates and the surfaces of the upper and lower platens of the press to which the mold plates are affixed during the expansion process.

As seen in FIG. 50 the openings of upper cells 100, 101 and 102 are not aligned, in the vertical plane, with the openings of lower cells 105. Thus each of lower cells 105 are overlapped, in the vertical plane, by two adjacent cells 100, 101 and/or 102. This pattern of overlap in the cell openings, as seen in FIG. 50, is a replication of the pattern of overlap in the vertical plane of the perforations in the faces of the two mold plates 93 and 71 which were used as the upper and lower mold plates, respectively, during the preparation of expanded blank 97.

It can also be seen that about one-half of all the cells in the blank are cells 105 which are open at the lower face of expanded blank 97, and that the remaining cells are cells 100, 101 and 102 which are open at the upper face of blank 97.

The process involved in preparing the expanded blanks shown above in the drawings which have a plurality of cells, i.e., are multicelled, from a blank of plastic having a Ta which has two contacting surfaces, such as a sheet of plastic, and which blank is expanded between a pair of mold plates having suitable contact surfaces could be more specifically described in a sequence of steps which comprises:

designing one or more of such contacting surfaces so that such surfaces are adapted to provide a pattern of at least some areas of contact between the contacting surfaces of the platens and the contacting surfaces of the blank, when such mold plates are brought into contact with such blank, inserting the blank between the contacting surfaces of the mold plates while the blank is heated to a temperature which is $\geq$ the Ta, of such blank, bringing the mold plates and the blank into contact at the contacting surfaces thereof while the blank is at a temperature of $\geq$ Ta so as to effect hot tack adhesion between the contacting surfaces of the blank and the mold plates, expanding the distance between the mold plates with the blank thus adhesively bonded thereto so as to effect an expansion of the cross-section of the blank with the attendant formation within the expanded cross-section of a plurality of cells separated by expanded ribs of the material in the blank, such cells encompassing areas of reduced pressure, and the configuration of each, and of the combination of all of the cells being in response to the pattern of contact between all of the contacting surfaces, venting the cells during such expansion so as to equilibrate the pressure within the cells with the pressure without the blank and thereby maintain the uniformity and integrity of the configuration of the resulting cross-sectional geometry, and cooling the expanded blank to a temperature below the heat distortion point of the plastic used for the blank.

As noted above the design of the pattern of contact between the contact surface of the platens and the contact surfaces of the blank can be provided in the surface of either or both of the mold plates, or in either or both of the contact surfaces of the blank. The venting can be accomplished through either or both of the surfaces of the platens, by using gas permeable, porous or perforated mold plates.

The expanded plastic objects made in accordance with the present invention are lightweight panels that may be rigid or flexible depending on the plastic used therein, and the degree to which the plastic is expanded. Additional rigidity may be supplied by bonding the expanded plastic member to one or more rigid lamina. The expanded plastics may be used, with or without other lamina bonded thereto, as structural elements for containers, walls, partitions, lath, packaging and other applications where light weight structural elements are used.

THE THERMOFORMABLE MATERIALS

The materials which may be employed as the blanks in the present invention are normally solid thermoformable materials which have a Ta of about 50° to 300°C., and preferably of about 100° to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks may be used in various forms such as sheet, netting and sheet with punched out designs. The fusible material used for the blank need not have any elastomeric qualities.

Fusible materials which might be used as blanks would include natural and synthetic thermoplastic resins and thermosetting resins, glass and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be interpolymers of one or more vinyl monomer and from 0 to about 50 mol percent of one or more non-vinyl monomers which are interpolymarizable with vinal monomers. The term "vinyl monomer" means a compound which contains at least one polymerizable group of the formula

Such vinyl monomers, therefore, would include the following: unsubstituted olefins, including mono-olefins such as ethylene, propylene, 1-butene, and isobutylene and polyolefins such as butadiene, isoprene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ether, vinyl isobutyl ether, 2-chloroethyl cinyl ether, methyl vinyl ketone, ethyl vinyl ketone, isobutyl vinyl ketone and the like; also vinyl pyridine, N-vinyl carbazole, N-vinyl pyrollidone, ethyl methylene malonate, acrolein, vinyl alcohol, vinyl acetal, vinyl butyral and the like. Non-vinyl monomers which may be interpolymerizable with vinyl monomers include carbon monoxide and formaldehyde.

The vinyl polymers would thus include, for example, polyethylene, polypropylene, ethylene-propylene copolymers, polyvinyl chloride, polyvinylidene chloride, polyvinyl fluoride, polystyrene, styrene-butadiene-acrylonitrile terpolymers, ethylene-vinyl-acetate copolymers, ethylene-acrylic acid copolymers, ethylene-acrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene-acrylic acid copolymers, ethylene-ethyl methacrylate copolymers, ethylene-ethylacrylate copolymers, ethylene-vinyl acetate copolymers, ethylene-acrylic acid-ethylacrylate terpolymers, ethylene-acrylic acid-vinylacetate terpolymers, and the like.

Also included within the term "polymer" are the metallic salts of those polymers or blends thereof which contain free carboxylic acid groups. Illustrative of such polymers are ethylene-methacrylic acid copolymers, ethylen-ethacrylic acid copolymers, styrene-acrylic acid copolymers, butene-acrylic acid copolymers, and the like.

Illustrative of the metals which may be used to provide the salts of such carboxylic acid polymers are the 1, 2, and 3 valent metals such as sodium, lithium, potassium, calcium, magnesium , aluminum, barium, zinc, zirconium, beryllium, iron, nickel, cobalt, and the like.

The polymers from which the blanks are shaped may be used in any of the forms in which they are commonly employed in the molding arts such as in the form of powder, pellets, granules and the like, and blends of the same with one or more adjuvant materials. Such adjuvant materials would include materials such as plasticizers, heat and light stabilizers, fillers, pigments, processing acids, extenders, fibrous reinforcing agents, impact improvers and metal, carbon and glass fibers and particles.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions under the described operating conditions. The adjuvants are used in amounts which will be effective for the intended purpose. Thus, for example, the effective amount of plasticizer is a "plasticizing amount," that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used then the filler would be used in such amounts as to provide the desired reinforcing effect.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banburry mixers and the like.

Although metallic materials of construction are usually only used as the mold plates in the process of the present invention, it is possible that expanded blanks of the present invention can also be made wherein a low melting metal, or alloy or compound thereof, can be used as the blank with mold plates made from non-fusible materials, or materials having higher fusion points than such low melting metallic materials.

Some rigid polymeric materials such as polysulfone resins, polycarbonate resins, and certain vinyl resins such as polyvinyl chloride, tend to develop internal residual stresses and associated frozen-in-strains when press formed into blanks. When such stresses and strains are present, it is not possible to readily use the blanks in the process of the present invention unless the blanks are first annealed to relax such stresses and strains in the blank. This annealing can be accomplished in about 0.5 to 240 minutes at temperatures ranging from the heat distortion temperature to the melting point of the resin as disclosed in U.S. Pat. application Ser. No. 213,432 filed Dec. 29, 1971 in the names of Walter H. Smarook and John Sonia and now abandoned.

Where the compositions used for the thermoformable blank contain fillers, the expansion temperature may have to be increased 5° to 20°C. to compensate for the increased viscosity of the resulting compositions.

THE PLATENS OR MOLD PLATES

The two mold plates used to pull the blank apart can be made of the same or different materials. The mold plates may have continuous or perforated surfaces, they may also be porous or non-porous, planar or non-planar and matching.

During the molding operation it is desirable as noted above, to vent the interior portions of the blanks which are being pulled apart. The need for venting the blanks being expanded, as noted above, arises due to the fact that a vacuum is created within the interior sections of the blank by virtue of the increase of the volume of such interior portions during the expansion operation. If the blank is not vented during the expansion operation, atmospheric pressure could cause puncture of the extended rib sections of the expanded blank during the expansion operation. This venting of the expanded blank can also be accomplished by using perforated or porous mold plates.

The materials from which the mold plates may be fabricated are normally solid materials which are either not fusible at the operating temperatures or which have a melting point which is at least 10°C. higher than the melting point of the fusible material from which the blank is fabricated.

Non-fusible materials which may be used for the mold plates would include cellulosic materials such as wood, paper, cardboard and compressed sawdust; thermoset or vulcanized compositions based on natural or synthetic resins; minerals such as graphite, clay and quartz; natural rock and stone materials such as marble and slate; building materials such as brick, tile, wallboard and concrete; and proteinaceous materials such as leather and hides.

Fusible materials having a relatively high Tg or Tm which could be used as the mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so called engineering plastics, such as polytetrafluoroethylene, nylon-6 resins, polyacetal resins, polyvinylidene fluoride, polyesters and polyvinyl fluoride; or fusible mateials coated with polytetrafluoroethylene.

The use of mold release agents such as silicone oils and fluorocarbon oils, or the use of mold plates made of materials having a low surface energy such as polytetrafluoroethylene, will insure the separation of the cooled expanded blank from the mold plates after the expansion operation, when the cooled expanded blank would not otherwise readily separate from the mold plates.

As noted above, one or both of the surfaces of the plates which are used to adhere to, and pull and expand the blank of plastic, may be an integral part of the press platens or molding device. One or both of the mold plates may also be removably mountable on the platen or molding device. The use of the removable type of mold plate is preferable where the mold plates are to be perforated or porous, so as to effect the venting therethrough, or where laminates are to be formed.

For various applications it may be desirable to promote the adhesion of the expanded blank to the mold plates, as in the formation of laminates. Certain compounds can be used as adhesion promoters for such purposes. The preferred of these adhesion promoters are various organosilicon compounds. These adhesion promoters may be used as primers and applied to the surfaces of the laminae substrates in layers which are at least monomolecular in depth. The adhesion promoters may also be incorporated or admixed in with the components of the blank. In the latter case, the adhesion promoter is added to the blank in an amount of about 0.00001 to 5.0 percent by weight based on the weight of the blank.

When the organo-silicon compound is to be used as a primer or incorporated into the blank, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds may be in the form of a monomer or polymer, e.g., silane or siloxane. They may, in fact, be any silicon-containing compound which contains an organo-peroxy group bonded to silicon, which organo moiety is bonded to the peroxy oxygen and thence to the silicon by a non-carbonyl carbon atom.

These silyl peroxides can be made pursuant to the processes described in U.S. Pat. No. 3,631,161 and Canadian U.S. Pat. No. 924,230.

Specific examples of such silyl peroxide compounds are vinyl tris(t-butylperoxy)silane, allyl tris(t-butylperoxy)silane, tetratris(t-butylperoxy)-silane, allyl(t-butylperoxy)tetrasiloxane, vinyl methyl bis(t-butylperoxy)silane, vinyl tris($\alpha,\alpha$-dimethyl benzylperoxy)silane, allyl methyl bis(t-butylperoxy) silane, methyl tris(t-butylperoxy)silane, dimethyl bis(t-butylperoxy)silane, isocyanatopropyl tris(t-butylperoxy)silane and vinyl diacetoxy(t-butylperoxy)silane.

The amino alkyl alkoxy silanes would include those having the structure:

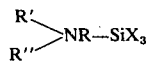

wherein X is alkoxy, aroxy or acryloxy; R is divalent alkylene of 3–8 carbon atoms with at least 3 sequential carbon atoms separating N from Si; at least one of R' and R" is hydrogen, and any remaining R' or R" is alkyl, $HO+CH_2CH_2(O)_x+_{1.5}$ where $x$ is 0 or 1, $H_2N\bar{C}\bar{O}$-, $H_2NCH_2CH_2$-, and $H_2NCH_2CH_2NHCH_2CH_2$-.

Examples of such aminoalkyl-alkoxy silanes would include gamma-aminopropyltriethoxy silane, gamma-aminopropyltrimethoxy silane, bis(beta-hydroxy methyl) gamma-aminopropyl triethoxy silane and N-beta-(aminoethyl)gamma-aminopropyl triethoxy silane.

The following examples are merely illustrative of the present invention and are not intended as a limitation upon the scope thereof.

The press used in these examples was a spring loaded Carver press, as shown in FIGS. 2 to 4 of the drawings. Two springs were used in the press and each had a deflection of 130 pounds per inch, and the springs were designed to mechanically pull the platens apart, as explained above with reference to FIGS. 2 to 4, at a predetermined rate, as regulated by a needle valve on the hydraulic ram of the press. The platens of the press were malleable cast iron and could be cooled by conduction, as desired, by the circulation of cold water therethrough. The platens of the press could also be heated by conduction, as desired, by heating platens 3a and 3b electrically. The temperature of the surfaces of the heated platens and mold plates were measured with a thermocoupled pyrometer.

EXAMPLE 1

A 52 mil thick expanded steel mesh, as shown in FIG. 1, was mechanically fastened to each of the platens of a Carver press. The diamond shaped pattern of the mesh had ⅜ inch by 1 inch openings with a 115 mil face width for the flat metal mesh strand. A 6 inch × 6 inch smooth surfaced sheet of polyethylene (having a density of 0.96, a melt index of 3; a Tm of 130°–140°C. and a Ta of about 135°–140°C.) which was 120 mils thick was coated with a solution, in toluene, of a silyl peroxide adhesion promoter, vinyl tris(t-butyl peroxy) silane, on both surfaces of the sheet so as to provide such surfaces, after the evaporation of the toluene, with a coating of about 2 milligrams of the silyl peroxide per square inch of surface area. The thus coated sheet was placed in the press, as shown in FIG. 2, after the mesh platens had been heated to a temperature of 185°C. The platens of the press were then closed so as to subject the blank (the peroxide coated sheet) to a pressure of 10 psi, as shown in FIG. 3. The polymer in the blank fused and wet and adhered to the steel mesh mold plates. The temperature throughout the mold plates and the platens of the press were allowed to equilibrate and the tdmperature thereof dropped to 135°C. Then the mold plates were separated, as shown in FIG. 4, at a velocity of 1000 mils/15 seconds, and then cooled to about 125°C. Venting of the blank was done through the mesh of the mold plates and between the contacting surfaces of the platens of the press and the mesh plates. The normal contacting surfaces of the platens of the press and the mesh plates were rough enough so as to allow sufficient venting therebetween.

The expanded sheet, with the mesh plates adhered thereto, was removed from the press. The resulting composite structure, shown in FIG. 5, was ¾ inch thick. The rib members of the expanded core of plastic were regularly spaced and firmly bonded to the mesh plates. A portion of the mesh surface of the composite, about 1 inch in diameter, was subject to a blow of 150 foot pounds which deformed the mesh plates and the expanded core, but did not cause adhesive delamination of the expanded core from the mesh plates. The resultant laminate was a structural core embodying two mesh skins suitable for an automobile dashboard or other portions thereof.

EXAMPLE 2

The procedure of Example 1 was followed except that the blank used was a sheet of a blend of polysulfone and silicone block copolymer. The sheet had a Tg of 180°C. and a Ta of about 300°C. The surfaces of the metal mesh plates that were to contact the blank were primed with a 5% solution of polysulfone in methylene chloride (as an adhesion promoter) and dried for 10 minutes at 2750°C. prior to fastening the plates to the platens of the press.

The blank was fused between the mold plates in the press, at 375°C. and expanded at 340°C. When cooled and removed from the press the expanded blank was firmly bonded to both of the mesh plates. The expanded composite was about 1 inch thick and had regular spaced ribbing as shown in FIG. 5. This composite expanded blank could be used as a structural member in furniture frames, interior automotive framing and the like.

EXAMPLE 3

The procedure of Example 1 was followed using a 60 mil thick sheet of the same high density polyethylene as was used in Example 1. The sheet of plastic, however, was not treated with the silyl peroxide adhesion promoter. The mesh mold plates were heated to 180°C. before the sheet of plastic was inserted therebetween. The sheet was then expanded about 5.4 times its original thickness. When then removed from the press and cooled to <125°C., the expanded plastic readily separated from the mesh plates, was light weight and rigid, and had the configuration of the expanded core member 2' shown in FIG. 5 with regular rib spacing.

EXAMPLE 4

The procedure of Example 3 was followed using as the blank, a 60 mil thick sheet of polypropylene which had a melt index of 5, a Tm of 165°–175°C. and a Ta of about 170°C. The polypropylene blank was inserted between mold plates heated to 195°C., and was expanded to 170°C. The resulting expanded blank, when cooled, readily separated from the mesh plates. It was 1 inch thick, had a weight of 3 pounds per square yard and had the configuration of expanded core member 21 shown in FIG. 5. This expanded blank floated on water and could serve as an evaporation shield and water cooling tower fill.

EXAMPLE 5

The procedure of Example 3 was followed using, as the blank, a 60 mil thick sheet of a thermoplastic polyester polyurethane which had a Tm of about 130°–170°C. and a Ta of about 160°–180°C. The polyurethane blank was inserted between mold plates heated to 175°C. and expanded at about 160°C. to four times its original thickness. The resulting expanded blank, readily separated from the mesh mold plates. It was resilient and had the configuration of expanded core member 21 shown in FIG. 5. The expanded blank could be used as a cushion pad, rug cushioning or automotive padding.

EXAMPLE 6

A perforated metal sheet, as shown in FIG. 6, was placed over a porous stainless steel metal plate and fastened mechanically to the top platen of the Carver press with the porous metal plate between the perforated sheet of metal and the top platen of the Carver press. A 120 mil thick sheet of the high density polyethylene used in Example 1 was inserted into the press, between the lower, smooth surfaced platen of the press and the perforated sheet of metal, after the platens of the press and the fastened metal sheet and plate were heated to 160°C. The press was then closed to slightly compress the plastic and to effect hot tack adhesion between the plastic and the contacting metal surfaces of the perforated metal sheet and the smooth face of the lower platen of the press. The temperature of all the metal surfaces was allowed to equilibrate at 135°C. and then the press was opened so as to expand the plastic about 250 mils. The plastic was then cooled to about 60°C. and it readily separated from the two metal surfaces acting as mold surfaces. The top of the resulting expanded sheet of plastic exhibited a positive replication of the perforated metal sheet and the bottom of the expanded sheet of plastic had a continuous smooth surface, as shown in FIGS. 7 and 8 of the drawings. The resultant expanded blank was rigid in flexure and suitable as a pallet.

EXAMPLE 7

An expanded sheet of plastic was prepared as in Example 6 from a mixture of 15% by weight of an ethylene-crylic acid copolymer and 85 percent by weight of the high density polyethylene of Example 1. The copolymer contained 83% by weight of ethylene and 17% by weight of acrylic acid. The blend was prepared by hot rolling the components on a two roll mill at full steam pressure (192 lbs./sq. in.). The blend had a Ta of about 120°C. The blend was molded into a 6 inch × 6 inch plaque which was 120 mils thick. Prior to inserting the plaque in the press the contacting faces of both of the platens were sprayed with a fluorocarbon polymer release agent. The plaque was processed in the Carver press as in Example 6. The plaque was inserted in the press at 170°C. and expanded at 140°C. The plaque was expanded to a new thickness of 1 inch at a rate of 1000 mils/15 seconds. The expanded plaque was then cooled and it readily separated from the platens. The expanded plaque had the configuration shown in FIGS. 7 and 8 of the drawings.

Subsequent placement of 20 mil thick aluminum plates heated to 185°C. onto this cooled expanded core, with slight pressure to ensure wetting resulted in a composite structural core having an intregally bonded skin upon cooling.

EXAMPLE 8

A 6 inch × 6 inch and 120 mil thick sheet was prepared from polyethylene (as used in Example 1) which was admixed with 2% by weight of a grey pigment. The sheet had a Tm of 130°–140°C. and a Ta of 135°–140°C. The sheet was inserted between the smooth faces of the non-porous platens of a Carver press which had been heated to 170°C. The sheet of plastic was slightly compressed between the platens to effect hot tack adhesion thereto. The press was allowed to cool to 135°C. and then the platens of the press were opened to a distance of 1 inch in 10 seconds. After one minute the platens of the press were then cooled with water to 30°C. and the expanded sheet of plastic was readily removed from the platens of the press. It measured 6 inches × 6 inches × 1 inch. The plastic article had uniform smooth skin surfaces with a random plastic ribbing in its expanded cross-section as shown in FIGS. 14 to 16 of the drawings. The density of the expanded article was 0.24 g/cc. The density of the sheet from which it was made was 0.96 g./cc.

EXAMPLE 9

An expanded article was prepared as in Example 8. The plastic used was 6 inch × 6 inch × 120 mil sheet of polycarbonate (General Electric's Lexan polymer) which was dried overnight at 110°C. in a vacuum oven to remove moisture. The resin had a Tg of about 150°C. and a Ta of 320°C. The press was heated to 315°C. prior to insertion of the plastic, and the expansion was conducted at 320°C. The sheet of plastic was expanded to a thickness of ¾inch and then cooled to ≤ 80°C. The cooled expanded article readily separated from the platens and had the random ribbed cross section and smooth surface characteristics of the expanded article shown in FIGS. 14–16 of the drawings.

Various polymeric resins used as the expandable blanks tend to pick up moisture when exposed to the atmosphere, i.e., about 0.05 to 5.0 weight %. This moisture is preferably removed from the plastic before inserting the plastic in the hot press so as to avoid blistering or bubbling in the heated plastic. The plastics which are more susceptible to this type of moisture absorption are the polycarbonate resins, cellulose acetate resins, acrylonitrile-butadiene-styrene terpolymer resins, hydroxy propyl cellulose resins, styrene-acrylonitrile copolymer resins, phenoxy resins, polymethyl methacrylate resins and nylon resins.

EXAMPLE 10

An expanded article was prepared as in Example 8. the plastic used was a 6 inch × 6 inch × 120 mil sheet of polymethyl methacrylate (Dupont Lucite polymer) which was dried overnight at 110°C. in a vacuum oven. The resin had a Tg of 105°C. and a Ta of 160°C. The sheet of plastic was expanded at 200°C. to a thickness of ¾ inch, and then cooled to ≤ 60°C. The cooled expanded article readily separated from the platens and had the random ribbed cross section and smooth surface characteristics of the article shown in FIGS. 14–16 of the drawings.

EXAMPLE 11

An expanded article was prepared as in Example 8 except that the platens used were 6 inch × 6 inch × 40 mil aluminum plates which had a leather grain-like embossment on the surfaces thereof which were to be used to effect the hot tack adhesion with the plastic to be expanded. These aluminum plates were then fastened to the platens of the Carver press so that the embossed surfaces thereof were facing the inserted blanks of plastic. A 6 inch × 6 inch × 100 mil sheet of polycaprolactone having an RV of 0.7 in benzene, a Tm of about 60°C. and a Ta of 60°C. was then inserted between the embossed aluminum platens which were heated to 100°C. The press was then closed so as to slightly compress the plastic and to effect hot tack adhesion therewith. The temperature of the press was then equilibrated at 65°C. and the sheet of plastic was expanded to a thickness of ½ inch at a rate of 1000 mils/8 seconds. The cooled (< 40°C.) expanded plastic readily separated from the platens. The expanded sheet of plastic had a random ribbed cross-section similar to expanded blank 17 of FIGS. 14–16 of the drawings. However, the surfaces of the expanded polycaprolactone blank were embossed with a replication of the leather grain embossment which was in the contact surfaces of the aluminum platens.

EXAMPLE 12

The same procedure was used as in Example 11 using the embossed aluminum platens. The plastic blank used was a 6 inch × 6 inch × 120 mil sheet of a nylon-6 resin having a Tm of 212–225°C. and a Ta of 240°C. The sheet of nylon-6 resin was inserted in the press at 275°C. and expanded at 250°C. to a thickness of ⅞ inch. The resulting expanded product was readily removed from the cooled (< 40°C.) press and has embossed surfaces and a random ribbed cross-section.

EXAMPLE 13

A 6 inch × 6 inch × 120 mil sheet of the polyethylene of Example 1, was expanded between two different surfaces to produce the composite shown in FIG. 17 of the drawings. The top mold 22 was a sheet of the expanded metal mesh used as the mold surface in Example 1. The lower mold surface 23 was a smooth surfaced solid sheet of carbon steel 32 mils in thickness. Each of mold surfaces 22 and 23 were removably mounted in the Carver press. The two contacting surfaces of the sheet of plastic were treated with a silyl peroxide adhesion promoter as in Example 1. The sheet of plastic was then expanded as in Example 1 so as to provide an expanded composite which was ⅞ inch thick and had the configuration of the composite shown in FIG. 17. Venting of the voids 24 that appeared in the upper portion of the expanding blank 21 during the expansion step in the process was accomplished through the perforations in the face of plate 22 and through the interface between perforated mold surfaces of expanded metal mesh 22 and the upper platen of the Carver press. The rib members 27 of the expanded core of plastic had an I beam configuration.

When the sheet of H.D. polyethylene plastic is not treated with an adhesion promoter, and is expanded between the mold surfaces 22 and 23, the expanded sheet can be readily separated from the mold surfaces and will have the configuration shown in FIG. 18. As such, it is a rigid lightweight structural plastic core panel.

EXAMPLE 14

This example discloses the prepartion of an expanded article as shown in FIGS. 19 to 20 of the drawings. A sheet of metal diamond shaped expanded mesh as shown in FIG. 1 of the drawings was fastened face to face to a sintered stainless steel porous plate. Two of such assemblies were made, one of which was attached to the face of the upper platen, and the other of which was attached to the lower platen, of the Carver press so that the porous plate in each case was adjacent the contact face of a platen of the press. The surfaces of the expanded mesh were then in a position to contact the blanks that were inserted in the press. The faces of the two metal mesh platens were also so arranged that the diamond shaped openings in the metal mesh plates faced each other at right angles, that is, one of the expanded metal mesh surfaces was turned at an angle of 90° to the other. A sixty mil thick sheet of the polyethylene of Example 1 was placed between the expanded mesh mold surfaces heated to a temperature of 180°C. The press was then closed to slightly compress the sheet of plastic and to effect hot tack adhesion between the sheet of plastic and the metal mesh mold surfaces. When the sheet of plastic then changed to a clear glossy state, the press was open so as to expand the sheet of plastic 5.4 times its original thickness. The resulting voids in the expanding sheet were vented through the perforations in the metal mesh mold surfaces and through the porous metal plates attached thereto. The expanded sheet was then cooled and it readily separated from the platens. It was rigid and lightweight and had the configuration shown in FIGS. 19 to 20 of the drawings.

EXAMPLE 15

Using the procedure of Example 14 a 60 mil thick sheet of polypropylene was inserted into the press at 195°C. and expanded at 170°C. When the expanded sheet was cooled it readily separated from the mold surfaces and had the configuration of the expanded article shown in FIGS. 19 to 20 of the drawings. The expanded plastic was 1 inch thick and weighed 3 pounds per square yard. The polypropylene resin used had a Tm of 165°–175°C., a Ta of 170°C., a density of 0.905 and a melt index of 5.

EXAMPLE 16

Using the procedure of Example 14 a 60 mil thick sheet of a thermoplastic polyester polyurethane was inserted into the press at 175°C. and expanded at 200°C.

to four times its original thickness. When the expanded sheet was cooled it readily separated from the mold surfaces and had the configuration of the expanded article shown in FIGS. 19 to 20 of the drawings. The sheet of expanded plastic was resilient. The resin had a Ta of 160°–180°C.

EXAMPLE 17

This example discloses the preparation of an expanded article as shown in FIGS. 21 to 22 of the drawings. Perforated stainless steel plates ⅛ inch thick and having, as the perforations therein, regularly spaced holes measuring about 5/16 inch in diameter were prepared. The holes were placed in aligned rows and columns in the plates, with each hole spaced about ⅛ inch from the next adjacent hole. One of the perforated plates was then attached to each of the platens of a Carver press, as were the metal mesh plates 1 shown in FIGS. 2–4 of the drawings. The perforated plates were so positioned on the faces of the top and bottom platens of the press that the opening of each hole of the upper perforated plate was exactly aligned with the opening of a hole in the lower perforated metal plate. A 6 inch × 6 inch × 60 mil sheet of the polyethylene of Example 1 was then inserted between the perforated metal mold surfaces which were heated to 180°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 135°C. and then the press was opened to expand the plastic to a thickness of ¾ inch. During the expansion step the resulting voids in the expanding plastic were vented through the perforations in the metal plates and through the interface between the perforated plates and the platens of the press. The expanded plastic was then cooled and it then was readily separated from the perforated metal plates. The expanded sheet had the configuration of the article shown in FIGS. 21 to 22 of the drawings. The perforated areas of the metal plates were reproduced as holes in the expanded sheet of resin, with the solid portions of the faces of the perforated plates being duplicated as solid flanges on the top and bottom faces of the expanded article joined by webs of plastic through the cross-section of the expanded sheet. Each of the holes in the top of the expanded plastic sheet was aligned with a hole in the bottom of the expanded sheet so that the expanded sheet provided a series of cells having a circular opening at the top and bottom thereof with uniform walls therebetween.

EXAMPLE 18

A 6 inch × 6 inch × ½ inch sheet of foamed polyethylene was expanded by the process of the present invention. The unexpanded foamed sheet had smooth surfaces and a density of 0.6 gram/cc. The foamed sheet was made from polyethylene having a density of 0.96; a melt index of 3; A Tm of 130°–140°C. and a Ta of 140°C. Smooth surfaced steel platens were used for expanding the sheet in the Carver press. The sheet of foamed plastic was inserted into the press at 205°C. The jaws of the press were closed to slightly compress the sheet of plastic and to effect hot tack adhesion thereto and then the temperature of the jaws was allowed to equilibrate to 135°C. Then the press was opened to expand the foamed sheet to a thickness of 1 inch. During the expansion step the expanding blank was vented through its sides as was blank 17 shown in FIGS. 14–16 above. When cooled to about 40°C, the expanded sheet readily separated from the platens. The surfaces of the expanded blank were smooth and uniform and the expanded blank had a density of 0.3 gram/cc. The cross-section of the expanded foamed sheet exhibited a random pattern of a large number of foamed cells which were larger in diameter than the cells in the original foamed blank.

EXAMPLE 19

This example discloses the preparation of an expanded article as shown in FIGS. 23 to 25 of the drawings. The top and bottom faces of a 6 inch × 6 inch × 120 mil sheet of the polyethylene of Example 1 was provided with, as temporary masking means, ½ inch wide strips of adhesive tape, spaced ½ inch apart, as shown in FIGS. 23 and 24 of the drawings. The remaining strips of exposed areas of the sheet were then coated with a fine coating of a mixture of talc and clay in a water/methanol mixture as a primary masking means as shown in FIG. 24 of the drawings. This was accomplished by first brushing the strips of exposed polymer area with a slurry consisting of powdered talc and bentonite clay diluted with methanol and water to a brushable consistency. While the applied slurry was still wet it was dusted with a bulb duster so that a fine coating of talc/clay adhered thereto which was about 1/32 inch thick. The sheet was then dried in an oven for 10 minutes at 100° C. and then the temporary masking means was removed. The sheet was then inserted between the metal platens of a Carver press heated at 160°C. The press was then closed so as to slightly compress the sheet and effect hot tack adhesion between the surfaces of the platens of the press and the strips on both surfaces of the blank from which the temporary masking means was removed. No hot tack adhesion was effected between the surfaces of the platens of the press and the strips on both surfaces of the blank which were coated with the primary masking means. The blank was then expanded at 140°C., by opening the press at a rate of 1000 mils/15 seconds, to a thickness of 1000 mils. During the expansion step the void spaces or channels 26 that arose between rib members 25 were vented at the ends thereof through the sides of the expanding blank. Upon being cooled to about 40°C. the expanded blank readily separated from the press and had the configuration of the expanded blank shown in FIG. 25 of the drawings.

The expanded blank had good rigidity in the longitudinal direction of the ribbing.

EXAMPLE 20

The top and bottom faces of a 6 inch × 6 inch × 120 mil sheet of the polyethylene of Example 1 were prepared with strips of temporary masking means and a primary masking means as disclosed above in Example 19 except that the strips on the top face of the sheet, although parallel to each other, were positioned at right angles to strips on the bottom face of the sheet, which latter strips were also all parallel to each other. The temporary masking means was then removed and the blank was expanded to a thickness of 1000 mils as disclosed in Example 19. During the expansion step the void spaces or channels that arose between the rib members were vented at the ends thereof through the sides of the expanding blank. Upon being cooled to about 40°C. the expanded blank readily separated from the press. The expanded rib members on the top face of the expanded blank were all parallel to each other, and at right angles to the expanded rib members on the bottom face of the expanded blank with a continuous thin film or membrane of the polymer between the two sets of rib members. Each of the rib members had an I beam cross-section configuration. The expanded sheet had a higher degree of rigidity in two planes than the one prepared in Example 19.

EXAMPLE 21

This example discloses the preparation of an expanded article as shown in FIGS. 26 and 27 of the drawings. The top face of a 6 inch × 6 inch × 120 mil sheet of the polyethylene of Example 1 was overlaid with a 2 mil thick sheet of polyethylene terephthalate (duPont's Mylar polyester) which had ⅜ inch holes punched therein in a regular pattern. This overlay sheet served as a primary masking means which allowed contact, through the holes therein, between the thus exposed areas of the top face of the sheet of polyethylene and the surface of the top platen of the press when the sheet of polyethylene was inserted, face up, in the press. The sheet of polyethylene was then inserted face up in the press at 160°C. and then the platens of the press were closed so as to slightly compress the sheet and effect hot tack adhesion between, on the one hand, the surface of the lower platen of the press and the entire lower face of the sheet of polyethylene, and, on the other hand, the surface of the upper platen of the press and the areas of the top face of the sheet of polyethylene which were exposed through the holes in the film of the primary masking means. No hot tack adhesion was effected at 160°C. between the surface of the upper platen of the press and the surfaces of the primary masking means, i.e., the film of polyethylene terephthalate. The blank was then expanded 1000 mils at 140°C. as in Example 19. As shown in FIGS. 26 and 27 of the drawings the resulting expanded blank had a series of I beam shaped members 28 protruding from one face of the sheet of plastic 29. The top surfaces 30 of members 28 were the portions of the sheet of polyethylene which were adhesively attached, through the holes in the primary masking means, by hot tack adhesion to the surface of the upper platen of the press during the expansion step in the process. The elongated members 28 were then formed as the platens of the press were opened with the top surfaces 30 of elements bonded thereto. During the expansion step the voids between expanding elements 30 were readily vented between the Mylar sheet and the platens and through the open sides of the expanding blank. The film of primary masking means was readily removed from the expanded blank and the press, and was reusable.

EXAMPLE 22

This example discloses the preparation of a multicell container as shown in FIGS. 28–29. A 100 mil thick sheet (6 inch × 6 inch) of low density polyethylene (density 0.92; melt index 2.0) having a Ta of 120°C. was inserted into a Carver press at 170°C. The Carver press was as shown in FIG. 2 of the drawings. The upper mold plate was a perforated aluminum plate, and the perforations therein had the staggered circular hole configuration shown in FIG. 40, with 1 inch diameter holes which were spaced ⅛ inch from each other (between the outer edges thereof). The upper mold plate measured 6 inch × 6 inch × ⅛ inch. The lower mold plate was the flat surfaced lower platen of the press. At a temperature of 160°C., the blank was compressed slightly to effect hot tack adhesion with the upper mold plate, and the lower platen of the press, and then expanded at the rate of 15 mils/second to twenty times its original thickness. Upon cooling to 35°C., the press was opened and the expanded blank was removed from the press. The resulting expanded article had the configuration shown in FIGS. 28 to 29 of the drawings. The base member and upper surface were about 2 to 5 mils thick. The lip member around the opening of each cell was about 2/32 inch to 4/32 inch wide. During the expansion step in the process the cells in the expanding blank were vented through perforations in the upper mold plate as discussed above. When size C dry cell batteries were inserted into the open cells of the expanded multicell container, they were held snugly therein by the lip members of the cells, even when the container was turned upside down. The shoulders of the tops of the batteries fitted snugly under the lip members of the cells, with the metal contacts at the tops of the batteries protruding above such lip members.

EXAMPLE 23

The procedure of Example 22 was followed using, as the blank, a 65 mil thick sheet (6 inches × 6 inches) of an ethylene-ethyl acrylate copolymer having a Ta of 110°C. The sheet was inserted in the press at 150°C., and pulled at a temperature of 140°C., to a height of 1.00 inch. The expanded article had the configuration shown in FIGS. 28 to 29 of the drawings and was much more flexible than the multicell container made in Example 22.

EXAMPLE 24

This example discloses the preparation of an expanded article as shown in FIGS. 43 to 44 of the drawings. Perforated aluminum plates ⅛ inch × 6 inches × 6 inches and having, as the perforations therein, regularly spaced holes measuring about ¾ inch in diameter were prepared. The holes were placed in aligned rows and columns in the plates, as shown in FIGS. 40–41, with each hole spaced about 3/16 inch from the next adjacent hole. One of the perforated plates was then attached to each of the platens of a Carver press so that the two perforated plates provided the overlap pattern for the perforations in the plates as shown in FIG. 42 of the drawings. The perforated plates were thus positioned on the faces of the top and bottom platens of the press so that the opening of each perforation of the upper perforated plate overlapped three of the perforations in the lower perforated metal plate. A 6 inches × 6 inches × 60 mil sheet of polyethylene (having a density of 0.96, a melt index of 3, a Tm of 130°–140°C. and a Ta of about 135°–140°C.) was then inserted between the perforated metal mold surfaces which were heated to 180°C. The press was then closed to slightly compress the sheet of plastic and to effect hot tack adhesion between the sheet of plastic and the contact surfaces of the perforated plates as shown in FIG. 5. The temperature of the platens and the metal mold surfaces was allowed to equilibrate at 140°C. and then the press was opened to expand the plastic to a thickness of ¾ inch. During the expansion step the resulting voids in the expanding plastic were vented through the perforations in the metal plates and through the interface between the perforated plates and the platens of the press. The expanded plastic was then cooled and it then was readily separated from the perforated metal plates. The expanded sheet had the configuration of the article shown in FIGS. 43 to 44 of the drawings. The perforated areas of the metal plates were reproduced as open cells (75 and 78 in FIGS. 43–44) in the expanded sheet of resin, with the solid portions of the faces of the perforated plates being duplicated as solid flanges on the top and bottom faces of the expanded article and joined by webs of plastic through the cross-section of the expanded sheet. The cells were all of the uniform volume and height. The panel was rigid.

EXAMPLE 25

This example illustrates the use of negative perforation means to make an expanded articles having the configuration shown in FIGS. 43–44. A 10 mil thick sheet of aluminum was perforated with a series of ¾ inch holes to produce a punched out sheet having the configuration of the mold plate shown in FIGS. 40–41. The ¾ inch holes were aligned in staggered rows and columns as shown in FIG. 40, and were spaced about 3/16 inch from the next adjacent hole. This perforated aluminum sheet was then placed over the surface of a 65 mil thick sheet (6 inches × 6 inches) of impact grade styrene which had a Ta of 180°C. A release paint made of 75% by weight of white clay (−200 mesh), 5% by weight of toluene and 20% by weight of ethyl alcohol was used to paint the circular portions of the polystyrene sheet that were exposed through the circular perforations in the aluminum mask, so that a pattern of circular discs of the release paint remained, upon subsequent removal of the aluminum mask. The thus treated plaque of polystyrene was then dried in an oven at 75°C. for 10 minutes and cooled. A similar pattern of circular discs of release paint was then applied to the other side of the plaque of resin, in the same manner. The pattern of the circular discs was applied to the two opposite faces of the plaques of resin so that when the plaque was laid flat on one such side, the pattern of the circular discs on each of the two faces of the plaque overlapped, in the vertical plane, three of the circular discs in the other face of the plaque. This pattern of overlap was similar to that provided by the two mold plates of FIG. 42 of the drawings.

The dried plaque was then inserted into a Carver Press between an upper and a lower aluminum mold plate which were affixed to the upper and lower platens, respectively of the press. Each of these two mold plates has a series of small vent holes drilled No 60 drill, ½ inch on centers) through the plates. The vent holes were so positioned on the mold plates, and the plaque of polystyrene was so positioned between the mold plates, that at least one such vent hole was adjacent each of the circular discs of release paint on each side of the plaque of the interfaces between the plaque and the two mold plates. The plaque of resin was inserted into the press while the platens and the mold plates were at a temperature of 210°C., and the plaque was expanded at the rate of about 15 mils/second, at 200°C., to an expanded height of 500 mils.

During the expansion step in the process voids or cells of reduced pressure formed in the blank at the site of the circular discs of release paint, in the same way that cells 75 and 78 formed in expanded blank 74 shown in FIGS. 43 and 44. These cells adjacent the release paint were vented during the expansion step through the vent holes in the mold plates. The expanded blank was rigid and had the configuration of the expanded blank shown in FIGS. 43–44 of the drawings. The cells in the expanded blank had openings which were essentially the same diameter as that of the circular discs of release paint. After the expansion step, and the blank was cooled, the release paint adhered to the walls and bases of the cells of the expanded blank. The paint could be removed, or left on the blank, depending on the intended end use application.

EXAMPLE 26

This Example discloses the preparation of an expanded article as shown in FIGS. 30 to 31 of the drawings. Two mold plates were used and they were those shown in FIGS. 35 to 37. Their contact surfaces measured 6 inches × 6 inches. The hexagonal perforations were placed in aligned and staggered rows and columns as shown in FIG. 35, with each perforation spaced about 3/32 of an inch from the next adjacent perforation. One of the perforated plates was then attached to each of the platens of a Carver press so that the two plates provided the overlap pattern shown, in replication, in the expanded blank of FIG. 30. A 6 inches × 6 inches × 60 mil sheet of the polyethylene of Example 1 was then inserted between the perforated metal mold surfaces which were heated to 180°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 145°C. and then the press was opened to expand the plastic to a thickness of 0.720 inch. During the expansion step the resulting voids in the expanding plastic were vented, in turn, through perforations 58, vent holes 59, channels 59A, and the open wall of U-shaped frame 56 as discussed above. The expanded plastic was then cooled and it then was readily separated from the perforated metal plates. The expanded sheet had the configuration of the article shown in FIGS. 30 to 31 of the drawings. The perforated areas of the metal plates were reproduced as open cells (42 and 43 in FIG. 30) in the expanded sheet of resin, with the solid portions of the faces of the perforated plates being duplicated as solid flanges on the top and bottom faces of the expanded article joined by webs of plastic through the cross-section of the expanded sheet. The cells were all of uniform volume and height. The panel was rigid and useful as a disposable shipping pallet.

EXAMPLES 27–38

Blanks in the form of 6 inches × 6 inches plaques, of different thermoplastic materials were expanded as in Example 26 to produced expanded articles as depicted in FIGS. 30 to 31 of the drawings, using the mold plate shown in FIGS. 35 to 37. The blanks were of various initial thicknesses, and they were expanded to various heights. Table I below lists a. the polymeric materials used in each plaque,
b. the Ta of each such polymeric material, in °C.,
C. the initial thickness, in mils, of the plaque when it was inserted in the press,
d. The temperature of the platens and mold plates when the plaque was inserted in the press,
e. the temperature of the platens, the mold plates and the plaque at the start of the expansion step in the process, f. the rate of speed, in mils/second, at which the mold plates were separated during the expansion step, and g. the final thickness of the expanded blank, in mils, h. comments on the flexibility or rigidity, and on the clarity or color of the resulting expanded blank.

The plaque of ABS resin used in Example 27 contained about 10% by weight of rubber impact modifier.

The plaque of polyvinyl chloride used in Example 38 was annealed at 145°C. for 2 hours to remove stresses and associated frozen-in-strains therefrom prior to insertion in the press.

During the expansion process the blanks were expanded at the rate of about 15–20 mils per second.

forated metal plates. The expanded sheet had the configuration of the article shown in FIGS. 38 to 39 of the drawings. The perforated areas of the metal plates were reproduced as open cells (67 and 68 in FIG. 39) in the expanded sheet of resin, with the solid portions of the faces of the perforated plates being duplicated as solid flanges on the top and bottom faces of the expanded article joined by webs of plastic through the cross-section of the expanded sheet. The cells were all of uniform volume and height. The panel was rigid and useful as an interior wall panel core structure having rigid skin lamina of 1/8 inch melamine phenolic resin bonded thereto by contact adhesives.

TABLE I

| Example | Polymer | Ta-20°C. | Initial Thickness, mils | Insertion Temperature °C. | Expansion Temperature °C. | Expansion Speed mil/sec | Expanded Thickness mils | Comments |
|---|---|---|---|---|---|---|---|---|
| 27 | Acrylonitrile-butadiene-styrene terpolymer | 180 | 80 | 220 | 210 | 10 | 960 | opaque, rigid |
| 28 | polymethyl-methacrylate | 160 | 130 | 210 | 190 | 15 | 1820 | clear, rigid |
| 29 | polystyrene (rigid) | 185 | 100 | 200 | 185 | 15 | 1000 | clear, rigid |
| 30 | polystyrene (rigid) | 185 | 60 | 195 | 185 | 15 | 600 | clear, rigid |
| 31 | hydroxy propyl cellulose | 110 | 100 | 160 | 140 | 10 | 800 | translucent, rigid, water soluble |
| 32 | polypropylene | 170 | 60 | 220 | 200 | 10 | 600 | opaque, rigid |
| 33 | styrene-acrylo-nitrile copolymer | 190 | 100 | 220 | 190 | 15 | 1000 | clear, rigid |
| 34 | ethylene-ethyl acrylate copolymer | 110 | 130 | 130 | 115 | 10 | 1300 | translucent, flexible |
| 35 | polyethylene, 0.917 density; 2.0 melt index | 120 | 60 | 160 | 140 | 15 | 500 | opaque, flexible |
| 36 | polyphenylene oxide-polystyrene blend | 235 | 75 | 250 | 235 | 10 | 500 | black, opaque rigid |
| 37 | Nylon-6 | 240 | 60 | 250 | 240 | 15 | 750 | opaque, rigid |
| 38 | (rigid) polyvinyl chloride | 155 | 100 | 200 | 180 | 10 | 1250 | clear, rigid |

Note: The composition used in Example 36 comprised 4% by weight of carbon black and 96% by weight of a 25/75 weight % blend of polyphenylene oxide and polystyrene.

EXAMPLE 39

This Example discloses the preparation of an expanded article 64 as shown in FIGS. 38 to 39 of the drawings. The mold plates used were those shown in FIGS. 35 to 37. One of the perforated plates was attached to each of the platens of a Carver Press so that the two plates provided the overlap pattern shown, in replication, in the expanded blank of FIG. 38. A 6 inches × 6 inches × 100 mil sheet of the polyethylene of Example 1 was then inserted between the perforated metal mold surfaces which were heated to 210°C. The press was then closed to slightly compress the sheet of plastic and to effect hot tack adhesion between the sheet of plastic and the contact surfaces of the perforated plates. The temperature of the platens and the metal mold surfaces was allowed to equilibrate at 190°C. and then the press was opened to expand the plastic to a thickness of 1¼ inch. During the expansion step the resulting voids in the expanding plastic were vented in turn through perforations 58, vent holes 59, channels 59A, and, the open wall of U-shaped frame 56 as discussed above. The expanded plastic was then cooled and it then was readily separated from the per-

EXAMPLES 40–47

Eight blanks, in the form of 6 inches ×6 inches plaques, of eight different thermoplastic materials were expanded to produce expanded objects as shown in FIGS. 32 to 33. The blanks were of various initial thicknesses, and they were expanded to various heights. Table I.

a. the polymeric material used in each plaque;

b. the Ta of each such polymeric material, in °C.;

c. the initial thickness, in mils, of the plaque when it was inserted in the press;

d. the temperature of the platens and upper mold plate when the plaque was inserted in the press;

e. the temperature of the platens, upper mold plate, and plaque at the start of the expansion step in the process;

f. the final thickness of the expanded blank, in mils;

g. comments on the flexibility or rigidity, and on the clarity or color of the resulting expanded blank.

During the expansion process the blanks were expanded at the rate of about 15–20 mils per second.

TABLE II

| Example | Polymer | Ta-°C. | Initial Thickness mils | Insertion Temp. °C. | Expansion Temp. °C. | Expanded Thickness mils | Comments |
|---|---|---|---|---|---|---|---|
| 40 | polycarbonate | 320 | 80 | 280 | 270 | 240 | rigid, black |
| 41 | 94.2/5.7 ethylene-ethyl acrylate copolymer | 110 | 60 | 140 | 130 | 240 | very flexible, clear |
| 42 | polymethylmethacrylate | 160 | 120 | 180 | 180 | 630 | rigid, clear |
| 43 | thermoplastic polyurethane polyester | 160–180 | 100 | 170 | 160* | 310 | very flexible, somewhat opaque, yellow |
| 44 | Nylon-6 | 240 | 65 | 250 | 240 | 325 | moderately flexible, relatively opaque |
| 45 | polystyrene | 185 | 60 | 190 | 185 | 240 | rigid - clear |
| 46 | (rigid) polyvinyl chloride | 155 | 130 | 205 | 195 | 650 | rigid, clear, yellow |
| 47 | polyethylene; 0.96 density 4 melt index | 135–140 | 60 | 160 | 150 | 300 | rigid - clear |

NOTES:
1. The polymeric material used in Example 40 was General Electric Co's Lexan polycarbonate which was filled with 4% by weight of carbon black.
2. The plaque of polyvinyl chloride used in Example 46 was annealed at 150°C. for 5 minutes prior to be inserted in the press, to remove stresses therein.

EXAMPLE 48

An expanded blank 88 as shown in FIGS. 46–47 was prepared. One surface of a 6 inches × 6 inches × 125 mil sheet of cellulose acetate having a Ta of 170°C. was provided with a series of parallel V-shaped grooves which were spaced ⅜ inch apart. The grooves were 50 mils deep and had a 60° angle between the sides thereof. Powdered clay was dusted in these grooves as a masking means. A second sheet of the same cellulose acetate, 6 inches × 6 inches × 40 mils was placed on top of the V-grooves, as shown in FIG. 45. The composite blank was then inserted in a Carver press at 220°C. and expanded at 180°C. at about 15 mils/second, to an expanded height of 1.24 inches. The expanded blank had the configuration shown in FIGS. 46–47. It was fairly rigid with a slight flexibility in rib members 92. Cells 91 had a width of about 11/32 inch. The expanded article was translucent and useful as a light diffuser or a decorative wall partition or panel.

EXAMPLE 49

An expanded article 88 was made as in Example 48. The resin used was polymethyl methacrylate having a Ta of 160°C. The upper sheet of resin was 35 mils thick, and the lower sheet in which the V-grooves were cut was 125 mils thick. The composite blank was inserted in the press at 180°C. and expanded at 160°C. at the rate of 15 mils/second to an expanded height of ⅞ inch. The expanded article had the configuration shown in FIGS. 46–47 and was translucent and useful as a light diffuser, or a decorative wall partition or panel.

EXAMPLE 50

This example discloses the preparation of an expanded article 97 as shown in FIGS. 50–52 of the drawings. The mold plates used were those shown and aligned as mold plates 71 and 93 in FIG. 49.

The resin expanded was a 75 mil thick sheet (6 inches × 6 inches) of acrylonitrile-butadiene-styrene terpolymer which had a Ta of 180°C.

Mold plate 71 was the same as in Example 24, and mold plate 93 was a 6 inches × 6 inches × ⅛ inch aluminum sheet.

The small holes 96 of mold plate 93 had a diameter of ⅜ inch, the larger holes 95 had a diameter of ½ inch and the square holes 94 measured ½ inch × ½inch. All of these perforations in mold plate 93 were positioned one inch from the center of the next adjacent perforation, in each diagonal alignment of such perforations, and the centers of all of the perforations were aligned in each vertical column and horizontal row thereof. As shown in FIG. 48, the square holes were ½ inch from each other in the vertical columns thereof and ⅜ inch from each other in the horizontal rows thereof. The large circular holes or perforations were positioned 7/16 inch from each other, and from the square perforations, in the vertical columns thereof. The small circular holes or perforations were positioned ⅜ inch from each other, and from the square perforations, in the vertical columns thereof.

The two mold plates were fastened to the upper and lower platens of a Carver press in the alignment shown in FIG. 49 of the drawings. The platens and the mold plates were then heated to 220°C. and the blank of terpolymer resin was inserted between the mold plates. The plates were closed on the blank to slightly compress it, and when the temperature of the press equilibrated at 205°C. the blank was expanded at the rate of 15 mil/second to an expanded height of 875 mils. The expanded blank was cream colored, opaque, and rigid, and had the configuration of the expanded blank 97 shown in FIGS. 50–52 of the drawings.

For practical purposes the process of the present invention is preferably conducted under ambient conditions of pressure, i.e. atmospheric pressure. The areas, cells or voids of reduced pressure that are formed within the expanding blank during the expansion step in the process have partial vacuums therein. Thus, the level of pressure in the voids is below that of the higher level of ambient atmospheric pressure. The venting of the void areas during the expansion step is to allow these two levels of pressure to be equilibrated so as to otherwise avoid rupturing of the cell walls existing between the void areas. The partial vacuums are created in the voids areas within the blank during the expansion step in the process of the present invention because the volume of the void or cell is created and expanded within a body of plastic whose interior has no access to the ambient atmosphere other than through the venting means. The difference between the level of ambient pressure and the level of reduced pressure existing under the partial vacuum conditions in the void areas is sufficient, in the absence of such venting, to rupture the relatively thin walls of expanded thermoformable material that separate the cells of reduced pressure from each other.

The blanks are uniformly heated prior to the beginning of the expansion step in the process. This can be accomplished by heating the blanks before or after they are inserted between the platens. Where the blanks are relatively thin, i.e., of the order of 150 mils, they can be readily heated, to the Ta of the thermoformable material therein, between the heated platens. The length of time needed to accomplish this will vary depending on the thickness of the blank, the Ta value, and the thermal conductivity and heat capacity of the thermoformable material, and the amount of contact that exists between the surfaces of the blank and the surfaces of the platen(s). This heating can be accomplished by contact with one or both of the platens.

Where the blanks are thicker than about 150 mils, and/or have relatively high Ta values, and/or will have relatively little contact with the platen surfaces, they can also be heated to a temperature which is, for crystalline materials, about 20°C. below the Tm of such materials, and for amorphous materials, about 20°C below the Ta of the amorphous material, before the blank is inserted between the platens, and then the blanks can be heated to the Ta of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching, or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The Ta values for a thermoformable material which are reported above were found to be, approximately, the lowest temperatures of which the related thermoformable material could be used in the process of the present invention. The reported Ta values are found, initially, by a trial-and-error technique in which a heated sheet of the thermoformable material (6 inches × 6 inches × 100 mils) was placed between continuous sheets of aluminum (6 inches × 6 inches × 100 mils) so as to ascertain, empirically, by trial-and-error, the minimum temperature at which the process of the present invention could be conducted. The reported Ta value was thus the minimum temperature at which the thermoformable material would adhere to the sheet of aluminum with sufficient force so that mechanical work applied to the molten thermoformable material, in the form of the pulling of the two sheets of aluminum apart, produced a viscous flow in the thermoformable material without loss of adhesion to the aluminum plates, as the plates were pulled apart to a height of at least twelve (12) times its original thickness.

These same minimum Ta values, as determined with aluminum mold plates, were also found to be the same (within about ± 1°–2°C.) for the respective thermoformable materials when the mold plates were also made of other metals such as steel and brass, and the other conditions were the same.

Subsequent to the initial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised as heated set of metal discs of known cross-sectional areas (0.994 in$^2$ ) which were thermostatically controlled and housed in a sealable chamber having pyrex windows in the walls thereof for observation purposes. A 100 mil thick disc sample (0.994 in$^2$ ) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish the vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ± 1°–2°C. of the minimum Ta values which had been previously found for such materials in the initial trial-and-error procedures. These minimum Ta values were also within about ± 1°–2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion grade of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from thermoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that it has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of thermoformable material can be expanded between the mold plates within the useful range of Ta values will also depend on several factors such as the viscosity of the thermoformable material at the Ta value employed, the mass and shape of the thermoformable material, the amount of area of contact between the surface of the mold plates and the surfaces of the blank, and the complexity of the cross-sectional geometry of the expanded article.

What is claimed is:

1. A process for expanding the cross section of a blank of thermoformable material, while it is in a thermoformable state, with the attendant formation of one or more voids having a partial vacuum therein within said cross section which comprises venting said voids during the increasing of the cross section so as to equilibrate the lower level of pressure within said voids with the higher level of ambient pressure without said blank and thereby regulate the uniformity and integrity of the resulting cross-sectional geometry of the expanded blank.

2. A process as in claim 1 in which the expansion of the cross section of the thermoformable material is accomplished by pulling the blank, while in said thermoformable state, between a pair of mold plates.

3. A process as in claim 2 in which said blank is adhesively bonded to said mold plates during said pulling.

4. A process as in claim 3 in which said blank is adhesively bonded to said mold plates as a result of hot tack adhesion between said blank and said mold plates.

5. A process as in claim 4 in which said blank comprises thermoplastic material.

6. A process as in claim 5 in which said thermoplastic material comprises synthetic resin.

7. A process as in claim 6 in which said synthetic resin comprises polyolefin resin.

8. A process as in claim 7 in which said polyolefin resin comprises polyethylene resin.

9. A process as in claim 7 in which said polyolefin resin comprises polypropylene resin.

10. A process as in claim 6 in which said synthetic resin comprises polyamide resin.

11. A process as in claim 10 in which said polyamide resin comprises nylon resin.

12. A process as in claim 6 in which said synthetic resin comprises vinyl resin.

13. A process as in claim 12 in which said vinyl resin comprises acrylate resin.

14. A process as in claim 7 in which said acrylate resin comprises polymethyl methacrylate resin.

15. A process as in claim 12 in which said vinyl resin comprises polyvinyl halide resin.

16. A process as in claim 14 in which said polyvinyl halide resin comprises polyvinyl chloride.

17. A process as in claim 12 in which said vinyl resin comprises ethylene-acrylic acid copolymer resin.

18. A process as in claim 6 in which said synthetic resin comprises polyurethane resin.

19. A process as in claim 6 in which said synthetic resin comprises polycarbonate resin.

20. A process as in claim 4 in which said blank comprises thermosetting resin.

21. A process as in claim 20 in which said thermosetting resin comprises polyurethane resin.

22. A process as in claim 20 in which said thermosetting resin comprises epoxy resin.

23. A process for expanding the cross section of a material having a Ta between a pair of mold plates so as to provide a product having an expanded cross-sectional geometry which comprises
positioning said material between said mold plates while said material is in a thermoformable state and is heated to a temperature which is $\geq$ the Ta of said material,
adhesively bonding said material by hot tack adhesion to each of said mold plates,
pulling said mold plates apart, while said material is so adhesively bonded thereto and said material is in said thermoformable state, so as to expand the cross section of said material and thereby effect within said material one or more voids having a partial pressure therein,
venting said voids during said pulling apart so as to equilibrate the lower level of pressure within said voids with the higher level of ambient pressure without said material and thereby preserve the pattern and the integrity of the voids in the resulting cross-sectional geometry, and
cooling the expanded material to a temperature below the heat distortion point of said material.

24. A process as in claim 23 further comprising the separation of at least one of said mold plates from the cooled expanded material.

25. A process as in claim 23 in which the surfaces of one or both of said mold plates are provided with a design which is adapted to provide at least some areas of hot tack adhesion contact between said mold plates and said material.

26. A process as in claim 25 in which the resulting cross-sectional geometry in the expanded material is a function of said design.

27. A process as in claim 26 in which the surface of only one of said mold plates is so designed.

28. A process as in claim 26 in which the surfaces of both of said mold plates are so designed.

29. A process as in claim 23 in which one or more of the contact surfaces of said material is designed to provide at least some areas of hot tack adhesion contact between said mold plates and said material.

30. A process as in claim 29 in which the resulting cross-sectional geometry in the expanded material is a function of said design.

31. A process as in claim 23 in which said venting is accomplished through at least one of said mold plates.

32. A process as in claim 31 in which said venting is accomplished through both of said mold plates.

33. A process as in claim 23 in which said venting is accomplished by venting means in said material.

34. A process as in claim 23 in which said material having a Ta comprises thermoplastic material.

35. A process as in claim 34 in which said thermoplastic material comprises synthetic resin.

36. A process as in claim 35 in which said synthetic resin comprises hydrocarbon resin.

37. A process as in claim 37 in which said hydrocarbon resin comprises polyolefin resin.

38. A process as in claim 37 in which said polyolefin resin comprises polyethylene resin.

39. A process as in claim 38 in which said polyethylene resin comprises high density polyethylene resin.

40. A process as in claim 37 in which said polyolefin resin comprises polypropylene resin.

41. A process as in claim 35 in which said hydrocarbon resin comprises polystyrene resin.

42. A process as in claim 35 in in which said synthetic resin comprises polyamide resin.

43. A process as in claim 42 in which said polyamide resin comprises nylon resin.

44. A process as in claim 35 in which said synthetic resin comprises vinyl resin.

45. A process as in claim 44 in which said vinyl resin comprises acrylate resin.

46. A process as in claim 45 in which said acrylate resin comprises polymethylmethacrylate.

47. A process as in claim 44 in which said vinyl resin comprises polyvinyl halide resin.

48. A process as in claim 47 in which said polyvinyl halide resin comprises polyvinyl chloride resin.

49. A process as in claim 44 in which said vinyl resin comprises ethylene acrylic acid copolymer resin.

50. A process as in claim 35 in which said synthetic resin comprises polyurethane resin.

51. A process as in claim 35 in which said synthetic resin comprises polycarbonate resin.

52. A process as in claim 23 in which said material having a Ta comprises thermosetting resin.

53. A process as in claim 52 in which said thermosetting resin comprises polyurethane resin.

54. A process as in claim 52 in which said thermosetting resin comprises epoxy resin.

55. A process for expanding, between a pair of mold plates, the cross section of a blank of material having a Ta so as to provide the material with an expanded cross sectional geometry, which expanded geometry comprises a plurality of cells separated by expanded ribs of said material, and wherein each of said mold plates has a contacting surface and said blank has two contacting surfaces, said process comprising designing one or more of said contacting surfaces so that said surfaces are adapted to provide a pattern of at least some areas of contact between the contacting surfaces of said mold plates and the contacting surfaces of said blank, when said mold plates are brought into contact with said blank, positioning said blank between the contacting surfaces of said mold plates while said blank is in a thermoformable state and is heated to a temperature which is $\geq$ said Ta, bringing said mold plates and said blank into contact at the contacting surfaces thereof while said blank is at a temperature of $\geq$ Ta so as to effect hot tack adhesion between said contacting surfaces, expanding the distance between said mold plates with said blank thus adhesively bonded thereto and while said blank is in said thermoformable state so as to effect an expansion of the cross-section of said blank with the attendant formation within said expanded cross-section of a plurality of cells separated by expanded ribs of the material in said blank, said cells encompassing areas of partial vacuum, and the configuration of each, and of the combination of all, of said cells being in response to the pattern of contact between all of the contacting surfaces, venting said cells during said expansion so as to equilibrate the lower level of pressure within said cells with the higher level of ambient pressure without said blank and thereby maintain the uniformity and integrity of the configuration of the resulting cross sectional geometry, and cooling the expanded blank to a temperature below the heat distortion point of said material.

56. A process as in claim 55 further comprising the separation of at least one of said mold plates from the cooled expanded blank.

57. A process as in claim 56 in which both of said mold plates are separated from the cooled expanded blank.

58. A process as in claim 55 in which at least one of the surfaces of said mold plates provides the contact surface design pattern.

59. A process as in claim 58 in which the surfaces of both of said mold plates provide the contact surface design pattern.

60. A process as in claim 55 in which at least one of the surfaces of the blank provides the contact surface design pattern.

61. A process as in claim 60 in which both surfaces of the blank provide the contact surface design pattern.

62. A process as in claim 55 in which said venting is accomplished through the contacting surface of at least one of said mold plates.

63. A process as in claim 62 in which said venting is accomplished through the contacting surfaces of both of said mold plates.

64. A process as in claim 62 in which the venting surface of said mold plate is gas permeable.

65. A process as in claim 63 in which the venting surfaces of both of said mold plates are gas permeable.

66. A process as in claim 62 in which said venting is accomplished through at least one of said mold plates at one or more areas of contact between said plates and said blank.

67. A process in claim 66 in which said venting is accomplished through both of said mold plates.

68. A process as in claim 58 in which said blank is a sheet of said material having a Ta.

69. A process as in claim 59 in which said blank is a sheet of said material having a Ta.

70. A process as in claim 60 in which said blank is a sheet of said material having a Ta.

71. A process as in claim 61 in which said blank is a sheet of said material having a Ta.

72. A process as in claim 55 in which said blank is heated to $\geq$ Ta by conduction by contact with at least one of said mold plates heated to $\geq$ Ta.

73. A process as in claim 72 in which both of said mold plates are so heated.

74. A process as in claim 55 in which said blank is heated to about 5° to 10°C. below its melting point prior to being positioned between said mold plates.

75. A process as in claim 55 in which the cross section of said blank is expanded up to about 20 times the pre-expansion thickness of said blank.

76. A process as in claim 25 in which said design is provided by perforations in the surfaces of one or both of said mold plates.

77. A process as in claim 58 in which said design is provided by perforations in the contacting surfaces of at least one of said mold plates.

78. A process as in claim 29 in which the design on one or more of the contact surfaces of said material is provided by masking means.

79. A process as in claim 60 in which the contact surface design pattern is provided by masking means on at least one of the surfaces of said blank.

80. A product made by the process of claim 1.

* * * * *

UNITED STATES PATENT OFFICE
CERTIFICATE OF CORRECTION

Patent No. 3,919,446  Dated November 11, 1975

Inventor(s) Walter H. Smarook

Page 1 of 3

It is certified that error appears in the above-identified patent and that said Letters Patent are hereby corrected as shown below:

Column 2, line 46, "o" should be omitted.

Column 7, lines 23 and 26, "net work" and "net-work" should read --network--.

Column 7, line 48, "bu" should read --by--.

Column 13, line 18, "any", first occurrence, should be omitted.

Column 19, line 26, after "surfaces" insert --53--.

Column 20, line 13, "duplciate" should read --duplicate--.

Column 21, line 22, "82" should read --72--.

Column 25, line 41, "interpolymarizable with vinal" should read --interpolymerizable with vinyl--.

Column 26, line 12, "cinyl" should read --vinyl--.

Column 26, line 53, "ethylen" should read --ethylene--.

Column 27, line 28, "banburry" should read --banbury--.

Column 29, line 18, "U.S." should be omitted.

Column 30, line 21, "tdmperature" should read --temperature--.

UNITED STATES PATENT OFFICE
CERTIFICATE OF CORRECTION

Patent No. 3,919,446　　　　　　　　Dated November 11, 1975

Inventor(s)　Walter H. Smarook　　　　　　Page 2 of 3

It is certified that error appears in the above-identified patent and that said Letters Patent are hereby corrected as shown below:

Column 30, line 52, "2750" should read --275--.

Column 32, line 1, "crylic" should read --acrylic--.

Column 35, line 60, "A" should read --a--.

Column 39, line 17, "articles" should read --article--.

Column 39, line 51, "No" should read --(No.--.

Column 41, in the titles of Table I, "Ta-20°C." should read --Ta-°C.--.

Column 42, line 54, "Table I." should read --Table II below lists:--.

Column 44, in Note 2, "be" should read --being--.

Column 44, line 37, "3/8" should read --5/8--.

Column 44, line 64, "voids" should read --void--.

Column 45, line 12, "150" should read -- $\leq 150$ --.

UNITED STATES PATENT OFFICE
CERTIFICATE OF CORRECTION

Patent No. 3,919,446  Dated November 11, 1975

Inventor(s) Walter H. Smarook  Page 3 of 3

It is certified that error appears in the above-identified patent and that said Letters Patent are hereby corrected as shown below:

Column 45, line 50, "of" should read --at--.

Column 46, line 16, "as" should read --a--.

Column 46, line 33, "the" should read --this--.

Column 49, line 33, "35" should read --36--.

Signed and Sealed this

Third Day of August 1976

[SEAL]

Attest:

RUTH C. MASON
*Attesting Officer*

C. MARSHALL DANN
*Commissioner of Patents and Trademarks*